(12) United States Patent
Veiseh et al.

(10) Patent No.: US 12,551,884 B2
(45) Date of Patent: Feb. 17, 2026

(54) INTEGRATED PLATFORMS FOR PRECISE POLY-SENSING AND IMAGING

(71) Applicants: Mandana Veiseh, Piedmont, CA (US); Seyed Bahram Bahrami, Piedmont, CA (US); Michial Duff Howell, Felton, CA (US); James Ferguson, San Jose, CA (US)

(72) Inventors: Mandana Veiseh, Piedmont, CA (US); Seyed Bahram Bahrami, Piedmont, CA (US); Michial Duff Howell, Felton, CA (US); James Ferguson, San Jose, CA (US)

(73) Assignee: Polybiomics, Inc., Piedmont, CA (US)

( * ) Notice: Subject to any disclaimer, the term of this patent is extended or adjusted under 35 U.S.C. 154(b) by 1206 days.

(21) Appl. No.: 17/183,010

(22) Filed: Feb. 23, 2021

(65) Prior Publication Data

US 2021/0229095 A1    Jul. 29, 2021

Related U.S. Application Data

(63) Continuation of application No. PCT/US2019/048022, filed on Aug. 23, 2019.
(Continued)

(51) Int. Cl.
*B01L 3/00* (2006.01)
*G01N 15/10* (2024.01)
(Continued)

(52) U.S. Cl.
CPC .... *B01L 3/502715* (2013.01); *G01N 15/1023* (2024.01); *G01N 15/1031* (2013.01);
(Continued)

(58) Field of Classification Search
CPC ....... B01L 3/502715; B01L 2300/0645; B01L 2300/0654; B01L 2300/0816;
(Continued)

(56) References Cited

U.S. PATENT DOCUMENTS

| | | |
|---|---|---|
| 5,501,959 A | 3/1996 | Lancaster |
| 5,512,490 A | 4/1996 | Walt |

(Continued)

FOREIGN PATENT DOCUMENTS

| | | |
|---|---|---|
| CN | 102549417 A | 7/2012 |
| CN | 104321421 A | 1/2015 |

(Continued)

OTHER PUBLICATIONS

Design and Application of an Optical Sensor for Simultaneous Imaging of pH and Dissolved O2 with Low Cross-Talk Maria Moßhammer, Martin Strobl, Michael Kuhl, Ingo Klimant, Sergey M. Borisov, and Klaus Koren ACS Sensors 2016 1 (6), 681-687 DOI: 10.1021/acssensors.6b00071 (Year: 2016).*

(Continued)

*Primary Examiner* — William H. Beisner
*Assistant Examiner* — Danielle B Henkel
(74) *Attorney, Agent, or Firm* — Haverstock & Owens, A Law Corporation

(57) ABSTRACT

A hybrid biosensing-imaging system that can operate inside an incubator, structures and methods are directed to placing modular and removable biosensors and biocompatible interfaces in 3D transparent test wells that contain biological samples. The technology enables continuous monitoring of multiple simultaneous parameters and functions of a living cell or cell clusters such as alterations of cellular ligands, physicochemical biomarkers, phenotypes, and/or extracellular compositions upon interactions with analytes or during progressions. Methods of capturing and analyzing direct (Continued)

orthogonal information from biological samples in 2D and 3D.

37 Claims, 24 Drawing Sheets

Related U.S. Application Data

(60) Provisional application No. 62/722,748, filed on Aug. 24, 2018.

(51) Int. Cl.
*G01N 15/1031* (2024.01)
*G01N 15/14* (2024.01)
*G01N 15/1434* (2024.01)

(52) U.S. Cl.
CPC .. *G01N 15/1434* (2013.01); *B01L 2300/0645* (2013.01); *B01L 2300/0654* (2013.01); *B01L 2300/0816* (2013.01); *B01L 2300/0822* (2013.01); *B01L 2300/0829* (2013.01); *G01N 2015/1006* (2013.01); *G01N 2015/1445* (2013.01); *G01N 2015/1486* (2013.01)

(58) Field of Classification Search
CPC ..... B01L 2300/0822; B01L 2300/0829; G01N 15/1031; G01N 15/1434; G01N 2015/1006; G01N 2015/1445; G01N 2015/1486; G01N 15/1433; G01N 15/1484; G01N 33/4833
See application file for complete search history.

(56) References Cited

U.S. PATENT DOCUMENTS

| | | | |
|---|---|---|---|
| 6,132,683 A | 10/2000 | Sugihara | |
| 7,027,628 B1 | 4/2006 | Gagnon | |
| 7,083,939 B2 | 8/2006 | Shull et al. | |
| 7,087,397 B2 | 8/2006 | Anaokar et al. | |
| 7,150,995 B2 | 12/2006 | Xie et al. | |
| D540,953 S | 4/2007 | Ramel et al. | |
| D561,905 S | 2/2008 | Ramel et al. | |
| 7,374,719 B2 | 5/2008 | Anaokar et al. | |
| 7,435,577 B2 | 10/2008 | Lawrence et al. | |
| 7,476,548 B2 | 1/2009 | Blatt et al. | |
| 7,588,724 B2 | 9/2009 | Nguyen et al. | |
| 7,625,721 B2 | 12/2009 | Lawrence et al. | |
| 7,635,597 B2 | 12/2009 | Blatt et al. | |
| 7,674,615 B2 | 3/2010 | Ramel et al. | |
| 7,749,770 B2 | 7/2010 | Nguyen et al. | |
| 7,771,655 B2 | 8/2010 | Ramel | |
| 7,887,750 B2 | 2/2011 | Blatt et al. | |
| 8,045,169 B2 | 10/2011 | Hebert et al. | |
| 8,101,415 B2 | 1/2012 | Irvin | |
| 8,460,539 B2 | 6/2013 | Huffstodt et al. | |
| 8,465,696 B2 | 6/2013 | Huffstodt et al. | |
| 8,574,919 B2 | 11/2013 | Ramel et al. | |
| 8,642,320 B2 | 2/2014 | Lawrence et al. | |
| 8,865,089 B2 | 10/2014 | Blatt et al. | |
| 9,180,455 B2 | 11/2015 | Phan et al. | |
| 9,182,418 B2 | 11/2015 | Lawrence et al. | |
| 9,395,373 B2 | 7/2016 | Huffstodt et al. | |
| 9,671,401 B2 | 6/2017 | Irvin | |
| 10,144,949 B2 | 12/2018 | Hughes et al. | |
| 10,145,840 B2 | 12/2018 | Patwardhan et al. | |
| 10,145,854 B2 | 12/2018 | Patwardhan et al. | |
| 10,908,113 B2* | 2/2021 | Chen | G01N 27/413 |
| 11,175,281 B2* | 11/2021 | Zafar | B01L 3/50853 |
| 11,988,583 B2* | 5/2024 | Inman | B01L 3/50853 |
| 2004/0086424 A1 | 5/2004 | Schembri | |
| 2005/0176155 A1* | 8/2005 | Klein | C12M 41/26 436/163 |
| 2008/0014571 A1* | 1/2008 | Teich | G01N 21/7703 435/287.1 |
| 2008/0207465 A1 | 8/2008 | Ravkin et al. | |
| 2013/0204107 A1 | 8/2013 | Lee | |
| 2013/0341734 A1 | 12/2013 | Merz | |
| 2014/0017803 A1 | 1/2014 | Deans | |
| 2014/0186876 A1 | 7/2014 | Teich | |
| 2014/0273191 A1 | 9/2014 | Tipgunlakant | |
| 2016/0077045 A1 | 3/2016 | Fife et al. | |
| 2017/0038282 A1 | 2/2017 | Veisch | |
| 2017/0056876 A1 | 3/2017 | Moskowitz et al. | |
| 2020/0116600 A1* | 4/2020 | Inman | G01N 21/6452 |
| 2021/0116334 A1 | 4/2021 | Hunt et al. | |
| 2021/0130881 A1 | 5/2021 | Cox et al. | |
| 2021/0229095 A1 | 7/2021 | Veiseh et al. | |

FOREIGN PATENT DOCUMENTS

| | | |
|---|---|---|
| CN | 102762713 B | 4/2016 |
| CN | 103308497 B | 11/2017 |
| CN | 105849539 B | 1/2020 |
| JP | 09281066 A | 10/1997 |

OTHER PUBLICATIONS

The Notification of Transmittal of the International Search Report and the Written Opinion of the International Searching Authority, International Application No. PCT/US23/18694, mailed on Sep. 19, 2023.
Second Office Action from Chinese Application No. 2018800428345, dated Oct. 9, 2022, 11 pages.
European supplementary search report mailed Mar. 21, 2021, PCT/US2018029864, 14 pages.
The International Preliminary Report, International Application No. PCT/US23/018694, mailed on Oct. 24, 2024.
The Official Letter dated Apr. 22, 2024 from European Patent Application No. 18790804.1.

\* cited by examiner

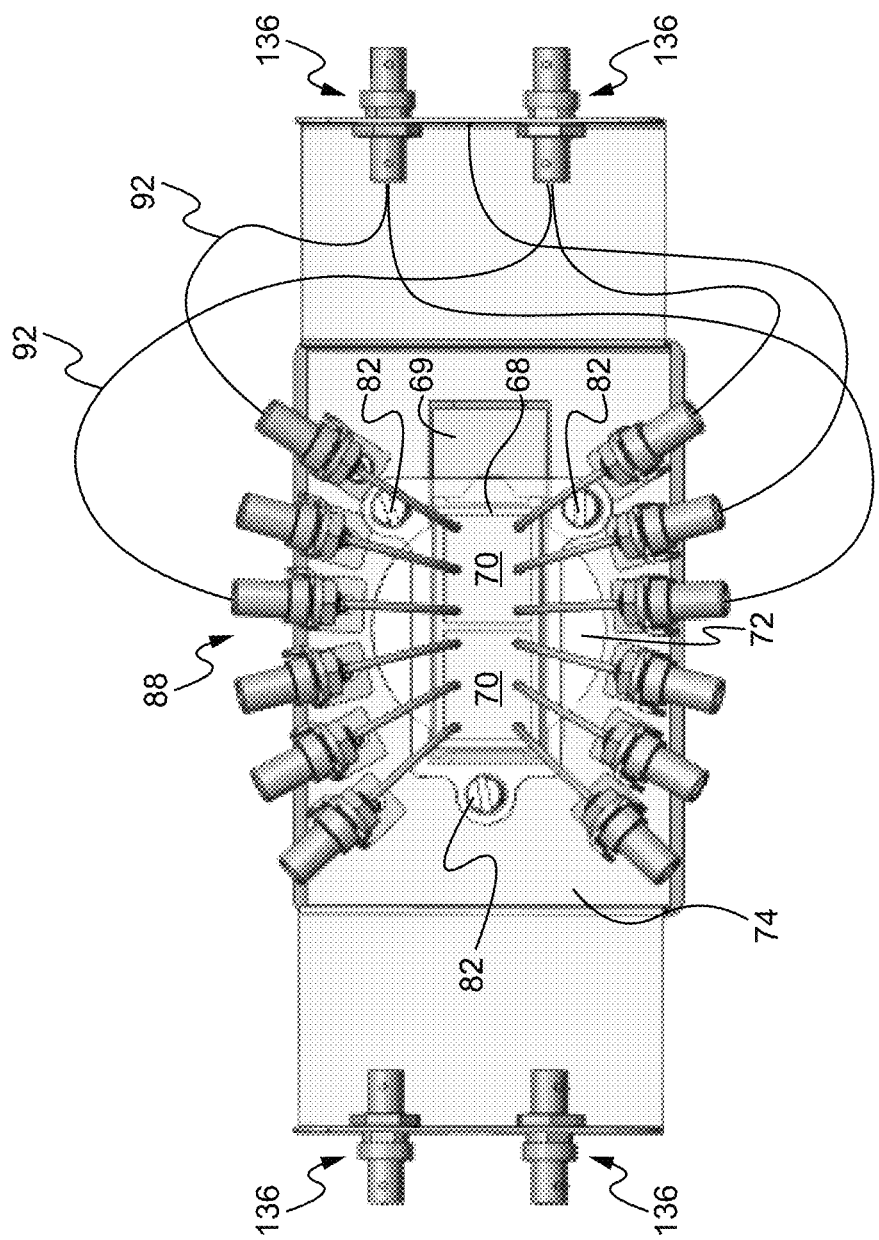

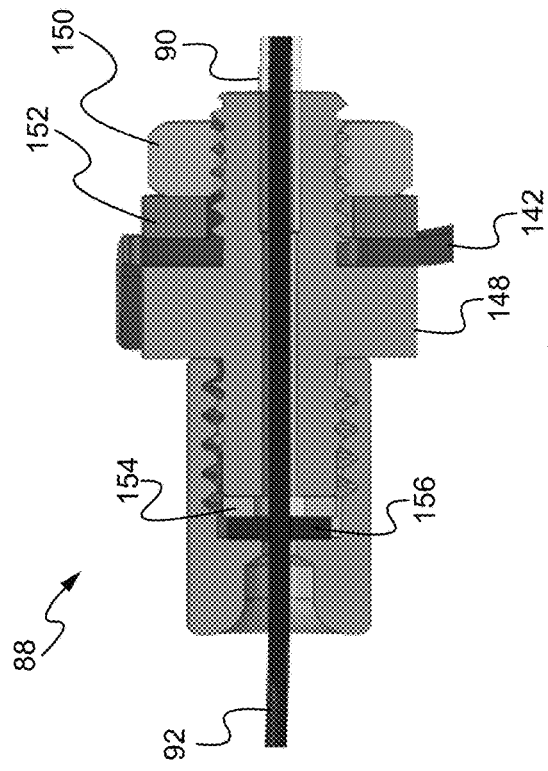
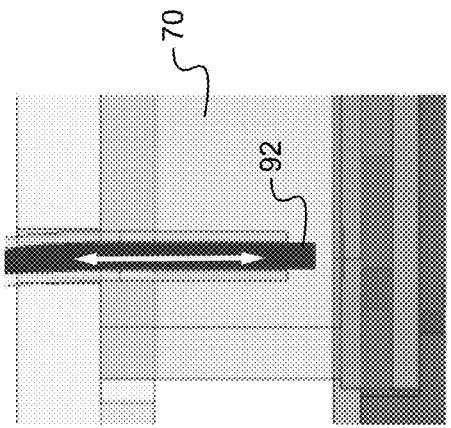
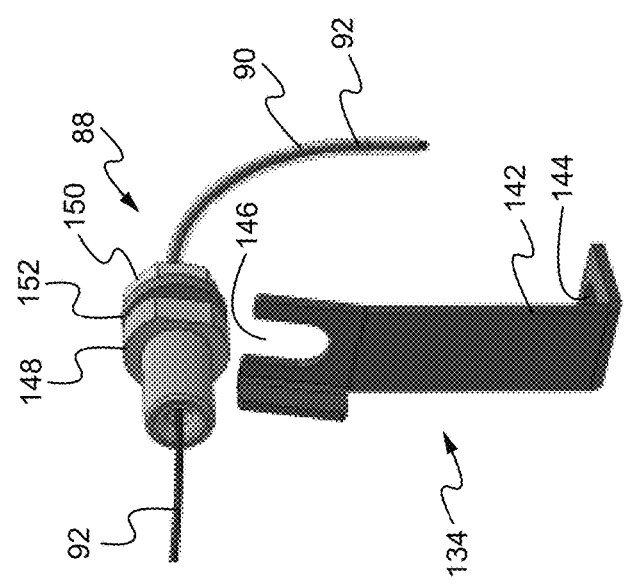
Fig. 15
Fig. 16
Fig. 14

INTEGRATED PLATFORMS FOR PRECISE POLY-SENSING AND IMAGING

RELATED APPLICATIONS

This Patent application claims priority under 35 U.S.C. § 119 (e) to the U.S. provisional patent applications, Application Ser. No. 62/722,748, filed on Aug. 24, 2018, and entitled "Integrated Platforms For Precise Poly-Sensing and Imaging", which is hereby incorporated in its entirety by reference. This Patent application claims priority of the PCT Patent Application, Application Serial No. PCT/US2019/048022, filed on Aug. 23, 2019 and entitled "INTEGRATED PLATFORMS FOR PRECISE POLY-SENSING AND IMAGING", which is hereby incorporated in its entirety by reference.

FIELD

The present invention is generally directed to the field of biosensors, biocompatible interfaces, bioinstruments for obtaining multiple cellular behaviors and environmental features in one well and assay. More specifically, the present invention is directed to systems and method of hosting, analyzing, manipulating and integrating orthogonal information from biological samples using a hybrid interface and biosensing-imaging system.

BACKGROUND

Technology is capable of sensing and tracking multiple physicochemical parameters and functions associated with the same cell(s) and other biological sample(s). Existing technologies require sensing of the various physicochemical parameters and functions of the related but different samples in separate environments and serially over time. Such restrictions may not be conducive for measuring changing characteristics over time or for deconvoluting the function of subpopulations that behave differently than the rest of the samples during processes such as cell progression from normal to disease state, or cell reaction over time to drugs, probes or toxins.

Characterization and control of biochemical processes may involve a multiplicity of intrinsic and extrinsic physical factors. Many processes are complex, and there may not be clear a-priori knowledge of what measurable factors may provide clear insight into the behavior of a given process. While there may be sensors available to measure individual physical or chemical factors, such as temperature, pH (acidity/alkalinity), or concentrations of substances in the reaction environment, introduction of said sensors can be disruptive to the process, and may be made difficult by the limited volume of some reaction spaces.

SUMMARY

Embodiments are directed to structures and methods of placing modular and removable sensors in transparent test wells that contain biological samples such as human-relevant live cells. Systems for tracking cell health and quantifying cell behaviors to obtain enabling cellular information and precise insights by continuous sensing and imaging (i.e. moving beyond endpoint assays) are explained to elucidate comprehensive insights. The sensors enable continuous monitoring of living cells and alterations of cellular ligands, physicochemical biomarkers, phenotypes, functions and/or extracellular compositions during cellular progressions, transition from normal to disease stage, or upon interactions with analytes such as drugs. Examples include cells and cellular secretoms that impact drug discovery and preclinical assays in the immunology and stem cell differentiation monitoring, where existing technology for continuous imaging, metabolite sensing, or multiplexed fluorescent assays that require rigorous signal to noise deification and spectral subtractions have not addressed current needs. As such, quantifying cell behaviors such as proliferation, cytotoxicity, or tracking apoptosis stages in real time, while imaging cells or tracking cell fate during adipogenic differentiation.

Given the low quantities of precious samples, which often must survive multiple long cellular assays, the proposed system deliver a needed capability for preclinical and clinical settings for obtaining actionable cellular insights towards better therapy selection. The non-invasive all-in-one monitoring capability accelerates cell health tracking processes with a high precision and confidence in obtained results. Embodiments of a biosensing-imaging system enables an integrated system and biochemical reaction environment that provides multiple types of sensing modalities that can be introduced into a common reaction volume, heretofore referred to as a well, so that different types of measurements can be obtained from the well at the same time. The different types of sensing modalities include, but are not limited to, camera images, electrical impedance for fully automatic and label-free sensing of cell proliferation, micromotion, and motility, acoustic impedance for cell surface mechano-sensing or mechanotype screening and mapping of percellular stiffness and cellular stiffness during stem cell differentiation, immune cell activation, and cancer cell invation, and chemical such as pH, $O_2$, $CO_2$, lactose, and glucose as well as cell secretome such as cytokines, chemokines, hormones, digestive enzymes, antibodies, extracellular proteinases, morphogens, toxins, amino acid, exosomes. This sensing capability may operate for extended periods of time at the same time that the biochemical process in the well is taking place. The sensing capability may be applied to more than one well within a common reaction environment enabling test and control to be performed in parallel. The readings of the differing sensing capabilities note the times of the sensing operations, allowing a user to observe possible connections between the biochemical process and changes to measured parameters obtained from the sensors.

The biosensing-imaging system includes a test plate (electrical interconnects substrate and well slide that includes one or more wells, such as the Genius Well™ by Polybiomics Inc., with integrated optical, chemical, electrochemical, and electromechanical sensors, imaging system, and software to capture and process multiple types of information from living biological samples. The test plates function as multilayered transparent culture well(s) that hold(s) living sample(s) in native environment(s), and mechanically fit into a hybrid imaging and sensing system. The imaging system views the evolving sample(s) and the sensors measure and monitor multiple properties and biological functions (such as cellular growth, movement, differentiation and transient events) according to user selected-schedule.

The biosensing-imaging system enables optimization of numerous system components including, but not limited to: form factors of sensors, electrode shape, size, configuration within the wells; sensing parameters including response time, sensitivity, specificity, signal-to-noise ratio, crosstalk, and biocompatibility; long-term and short-term signal stability, including noise floor and drift of each sensor; custom data acquisition, processing, and unification from a known sample.

Detection limits, stability, noise and cross-talk are established in accordance with biologically known target values such as well-characterized breast cancer metastasis progression series or cell apoptosis progression models to optimize response time, signal-to-noise ratio, sensor drift, and signal specificity. To increase signal to noise ratio and to sense accurately and stably over the span of a typical assay, biocompatible surface modifications are performed in the regions surrounding the electrodes.

Another component is customized data acquisition and processing software to enable access a processing of polymodal cellular data in a unified manner. Specifically, the analytics connects cellular attributes to create model-ready data and enable user to generate analysis reports from the model-ready data that contains engineered features (e.g. cell count from image analysis) for deep queries. For instance, the resulting report generates a comprehensive new knowledge of candidate cellular effects to enable better lead selection earlier in pharma pipeline and accelerate discovery and product development. Furthermore, the analytics enables access to the orthogonal components of data for extracting or predicting new actionable insights, such as dynamic cellular behaviors that would not be detectable by static measurements or visualizations of fixed/dead cells. Collectively, this leads to formation of new types of cellular databanks and extraction of previously-unattainable insights.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Several example embodiments are described with reference to the drawings, wherein like components are provided with like reference numerals. The novel features of the invention are set forth with particularity in the appended claims. The example embodiments are intended to illustrate, but not to limit, the invention. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 13 illustrates a top down view of the structure of FIG. 12 with select optical fibers connected to select couplers.

FIG. 14 illustrates a perspective exploded view of the probe mount and corresponding probe according to some embodiments.

FIG. 15 illustrates a cut-out side view of the probe from FIG. 14 according to some embodiments.

FIG. 16 illustrates a cut-out side view of a portion of the well and adjustment of the optical fiber depth.

DETAILED DESCRIPTION

Figure 1:
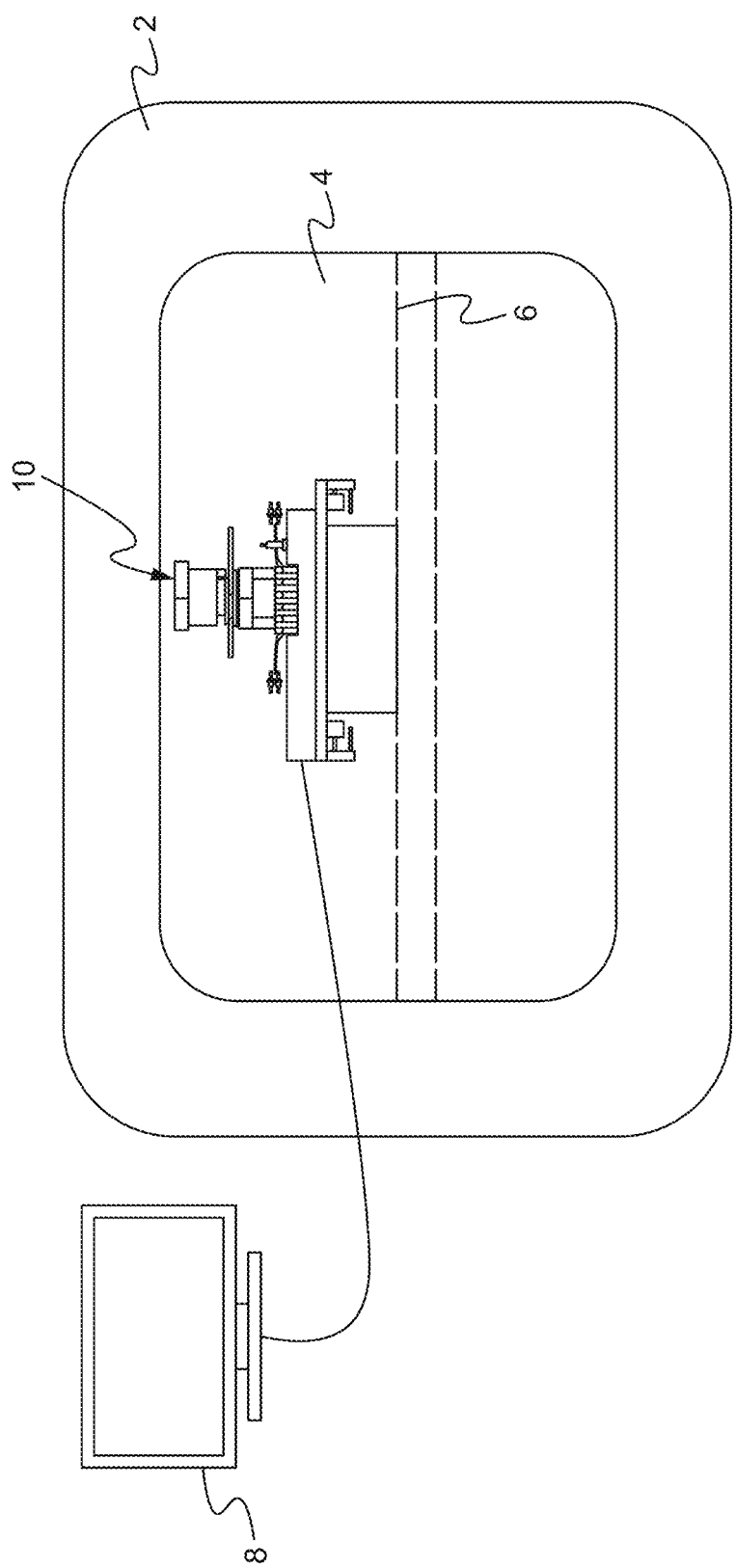
FIG. 1 illustrates a conceptual diagram of a biosensing-imaging system in an exemplary implementation according to some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Embodiments of the present application are directed to a biosensing-imaging system. Those of ordinary skill in the art will realize that the following detailed description of the biosensing-imaging system is illustrative only and is not intended to be in any way limiting. Other embodiments of the biosensing-imaging system will readily suggest themselves to such skilled persons having the benefit of this disclosure.

Reference will now be made in detail to implementations of the biosensing-imaging system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The terms biosensing-imaging system or multi-sensing imaging, multi-modal sensing and imaging, polybiosensing and bioimaging, 2D or 3D or 4D polysensing and imaging, and polysensing and imaging, are used interchangeably in this document.

A biosensing-imaging system is capable of tracking multiple physicochemical parameters of biological samples non-invasively and continuously. The biosensing-imaging system and methods of using the biosensing-imaging system enable new ways of detecting, monitoring, and interrogating live cell for various application such as multiplexed biomarkers analysis. For example, new polymodal signatures and temporal/spatial correlations can be measured that would otherwise be missed by static and single endpoint measurements or summing of single mode signatures sensed by separate equipment or at different times. Intrinsic and/or extrinsic sample heterogeneity can be detected and predicted. Rates of heterogeneity and regulatory elements can be compared to explore pattern of variations in depth. In some embodiments, the biosensing-imaging system includes wells having multiple different sensor types integrated into, attached onto, and/or inserted into each well, and an incubator-friendly reader for continuous and simultaneous capture of physicochemical and phenotypic characteristics from biological samples. The biosensing-imaging system enables hosting, analyzing, and manipulating biological samples within each well. In other embodiments, every well does different sensing but at the same time. Some examples for modalities of measurements include, but are not limited to, electrical, optical, acoustic and chemical including ion measurements. Some of the sensors are thin Piezoelectric transducers (PZT) or ultrasonic transducers on the sidewalls of the well or on the inserts that are placed inside the well. Some of sensors are a large array of densely packed and biocompatible PZTs closer to cell clusters. Some are miniaturized sensitive PZT sensors that can distinguish between signal attenuation and random phase change or destructive or constructive interferences, because different locations of the cell clusters may receive different amounts of sound waves. Those include sparse array of transducers at sizes that are one-half of the wavelength. In all cases, a mechanism to provide multiplexing of isolated wires to fewer number of wires in a defined spatial configuration according to form factor of the well or inserts are considered. Some examples of chemical sensors are sensor dots and foils that measure chemical analytes and create signals such as optical or electrical when exposed to different analytes. Examples of sensors include, but are not limited to, ion-sensitive FETs, chemical-sensitive FETs or sensors whose color changes, sensors whos electrical or chemical, or physical properties changes. Ion concentrations can be measured in various ways such as ion-selective membrane based sensors. When this membrane is immersed in the fluid under test, a potential is generated that scales with the logarithm of the ion activity under test, which is a measure for its concentration. Such ion selective electrode can be significantly miniaturized. An example is the chemical field effect transistor (FET) in which the modified gate of a FET is in contact with the fluid under test and influences the source-drain current depending on the ion level of interest. Any ion selective sensor consists of two essential parts: the ion selective electrode is the first, while the second is the reference electrode: the ion selective electrode is immersed in the solution under test as well and the reference electrode potential should be independent of the solution composition. One example of a commonly used type of reference electrode is a silver chloride (AgCl) electrode in contact with a reservoir with a fixed Cl-concentration. The internal reservoir is separated from the fluid under test by a porous frit (junction). The reference potential remains stable if the Cl-concentration remains unaltered. Some example of a miniaturized, long-term stable reference electrode planar AgCl for Cl-measurements or IrOx for pH measurements on a Si substrate to form the multi-ion sensor, Other types of sensors are immersion sensors that are connected to a chemical reader through wired or wireless connections and measure chemical analyte changes inside the well. Another example is a system that collects samples from each well and send the samples to a chemical reader to sense and analyze chemical changes. Chemical sensors also can be implemented as dyes that can be sensed using a fluorescence process. In general, sensors can be implemented either as probes inserted into the well, they can be implemented as packets that are dropped in the well, they can be printed on the bottom or side of the well surface, and/or they can be attached to the bottom or side of the well surface. The dyes could be fluorescent voltage-sensitive dyes to detect mitochondrial function as a measure of cell energetic activities. A distinctive feature of the early stages of apoptosis is the disruption of the mitochondria, including changes in membrane and redox potential, which can be tracked specifically by assaying mitochondrial membrane potential using dyes that are positively charged. Dyes accumulate in the electronegative interior of the mitochondrion.

When extending this concept to a multi-well implementation, the different wells can either have identical sensor capabilities, or different wells can be equipped with different sensor types. In other words, mix and match of different sensor types for different wells can be applied. Optics or electronics are used to measure the sensor outputs of the different wells.

A biological sample may be obtained from a subject. A subject can be a biological entity containing expressed genetic materials. The biological entity can be single or multiple cells, cell compartment, tissue, organel, organoid, plant, animal, or microbe, including, e.g., bacteria, bacterial plasmids, viruses, fungi, and protozoa. The subject can be tissues, single cells, cell clusters and their progeny of a biological entity obtained in vivo or cultured in vitro. The subject can be a mammal. The mammal can be a human. A biological sample may be an environmental sample. Examples of environmental samples can include air, water, soil, agricultural, or geologic.

A biological sample can comprise a plurality of cells. A plurality of cells may be present in a variety of three dimensional structures. A plurality of cells can be adherent, suspended, cultured on a substrate such as extracellular matrices, gel, hydrogel, or a combination thereof. A plurality of cells can be adherent to one another or to a surface. Cells can be adherent to a surface and present in a monolayer, bi-layer, multilayer, 3D structure, organic spheroid and the like. A plurality of cells can be heterogeneous or homogenous. A plurality of cells may be initially homogenous and change over time to become heterogeneous. A plurality of cells may be heterogeneous and the heterogeneity may change over time, along with the properties of the cells. An example of a heterogeneous cell population that may change over time are cancer cells, which may exhibit abnormal proliferation or differentiation (e.g., as exhibited in tumor growth or tumor metastasis).

A biological sample may be cell, cell compartment, tissue, organelle, organoid, solid matter, such as biological tissue. A biological tissue may comprise a plurality of cells, such as primary cells, cell lines, suspension cells, stem cells, progenitor cells from different type and tissue such as endothelial cells, fibroblasts, stellate cells, and the like.

A biological sample may be a fluid, such as biological fluid such as blood or cell culture media. A biological fluid can include any fluid associated with living organisms. A biological fluid may include components within the fluid. For example, a biological sample can include blood with components of the blood, such as white blood cells, red blood cells, platelets, and the like, and components thereof. A biological sample may comprise cellular components, including, for example, biomolecules and intracellular structures. Non-limiting examples of biomolecules include proteins, nucleic acids, lipids, carbohydrates, hormones, extracellular matrix, extracellular components, secretome, or exosomes, and the like. Non-limiting examples of intracellular structures include organelles such as vesicles, mitochondria, lysosomes, centrosomes, exosomes, etc. A biological sample may comprise in vitro models, such as induced pluripotent stem cells (IPS), spheroids, organoids, in vitro fertilization samples (e.g., eggs, sperms, embryo), or tumor models. A biological sample, such as tissue, may be cultured in a three-dimensional environment. A biological sample may comprise non-host components, such as bacteria, viruses, fungi, yeast, nematodes, or other microbes.

A biological sample may be analyzed to detect a single analyte (e.g., protein, amino acid, or nucleic acid) or multiple analytes (e.g., protein and nucleic acid). The multiple analytes may be detected concurrently or subsequently. Analytes may be cellular and/or acellular analytes. Non-limiting examples of cellular analytes may include ions, proton, oxygen, peptide, protein, enzymes, exosomes, or nucleic acid molecules.

Analytes of a biological sample may be detected by labeling the analytes. Analytes may be coupled to a label for detection by a sensor. A label may be a composition that yields a detectable signal, indicative of the presence or absence of the analyte. A label may be directly detectable label (e.g., a fluorescent label). A fluorescent label may be any fluorescent label such as a fluorescent label (e.g., fluorescein, Texas red, rhodamine, ALEXAFLUOR® labels, and the like), a fluorescent protein (e.g., GFP, EGFP, YFP, RFP, CFP, cherry, tomato tangerine, and any fluorescent derivate thereof). A label may be indirectly detectable label (e.g., a binding pair member). An indirect label may include biotin (a binding pair member), which may be bound by streptavidin (which may itself be directly or indirectly labeled). Non-limiting examples of labels include: a radiolabel (a direct label) (e.g., 3H, 125I, 35S, 14C, or 32P); an enzyme (an indirect label) (e.g., peroxidase, alkaline phosphatase, galactosidase, luciferase, glucose oxidase, and the like); a fluorescent protein (a direct label) (e.g., GFP, RFP, YFP, and any derivatives thereof); a metal label (direct label); a colorimetric label; a binding pair member; nanoparticles such as metalioc, non-metalic, or polymetic based and the like. Binding pair member may refer to one of a first and a second moiety, wherein the first and the second moiety have a specific binding affinity for each other. Non-limiting examples of binding pairs include: antigen/antibody (e.g., digoxigenin/anti-digoxigenin, dinitrophenyl (DNP)/anti-DNP, dansyl-X-anti-dansyl, fluorescein/anti-fluorescein, Lucifer yellow/anti-lucifer yellow, and rhodamine anti-rhodamine), biotin/avidin (or biotin/streptavidin) and calmodulin binding protein (CBP)/calmodulin. Any binding pair member may be suitable for use as an indirectly detectable label.

A label may be detected using suitable detection methods. For example, cellular components such as mitochondria may be labeled with a directly detectable label, such as a fluorescent label (e.g., MitoSox Red dye). The fluorescent label may be detected using an optical measuring modality. In another example, cellular components such as proteins may be detected using a binding member pair, such as antigen/antibody. The protein may be contacted with a labeled primary or labeled secondary antibody and binding of the protein with the labeled antibody may be detected using suitable modality, such as chemical modality. The chemical modality may detect activity of an enzyme (e.g., peroxidase) coupled to the antibody, indicative of binding of the antibody to the protein.

Analytes may be detected using label-free techniques. Label-free detection may be accomplished, for example, using label-free imaging, sensor dots, electrical, impedance, spectrometric methods, magnetic, microscopy, biomolecular interactions, chemical, electrochemical, electromechanical, or acoustic measurements.

Analytes may be cellular components, such as nucleic acid molecules, DNA or RNA, for example. Nucleic acid molecules may be coupled to a label for detecting the nucleic acid molecules. Nucleic acid molecules may be processed prior to detection. For example, nucleic acid molecules may be amplified, prior to detection. In such cases, the label may be detectable as nucleic acid molecules undergo amplification. In another example, nucleic acid molecules, such as RNA, may be reverse transcribed in order to detect the nucleic acid molecules. Labels may be covalently or non-covalently (e.g., ionic interactions) coupled with the nucleic acid molecules. In some cases, a label coupled to nucleic acid molecule may be an optically-active dye (e.g., a fluorescent dye). In some cases, a label may be a sequence-specific oligonucleotide probe that is optically active when hybridized with a complementary nucleic acid molecule. In some other cases, a label may be a radioactive species. Methods for detecting nucleic acid molecules may include optical detection methods (e.g., fluorimetry and UV-vis light absorbance), spectroscopic detection methods (e.g., mass spectrometry, nuclear magnetic resonance (NMR) spectroscopy, and infrared spectroscopy), electrostatic detection methods (e.g., gel based techniques, such as, gel electrophoresis) or electrochemical detection methods (e.g., electrochemical detection of amplified product after high-performance liquid chromatography separation of the amplified products).

Modalities may be selected based on the detection methods. For example, optical measuring modality may use a confocal microscopy module for detecting a fluorescent label. In another example, an impedance measuring modality may use a module for measuring conductivity in order to determine the changes in impedance. Chemical measuring modality may use detect products of a chemical reaction, selective ion, polarity, such as substrate conversion by an enzyme. Acoustic measuring modality may detect absorbance and/or transmission of sound waves through a biological sample for measuring stiffness.

Signals obtained from the detection method using one or more modalities may be measured by one or more sensors. The measured signal may be combined or separately analyzed to generate a profile for a biological sample, such as a cell population. For example, the signals from an optical measuring modality may be measured by sensors to determine physical, and/or chemical profile of the cell population. The signals may be used to determine physical profile, such as morphological profile including size, shape, cellular components, and the like. The signals may be used determine chemical profile, such as concentration of ion, peptide, amino acid, protein, antibody, carbohydrate, lipid, biomolecule, DNA, RNA, exoxome analytes.

Each individual well is formed for storing a fluid sample. A fluid sample is a gel, liquid, or other medium that includes the biological sample to be analyzed. Although subsequently described below in terms of analyzing a cell, it is understood that application is not limited to a cell, or a cell colony, and generally applies to a biological sample. Each well can also contain a culture media that is specific for each biological sample to be analyzed and provides, for example, nutrient materials, serum, and/or antibiotic for culturing each sample type or cell flowing in a media or liquid that is passing through poly sensors.

The biosensing-imaging system enables at least the following features: sense sample within the environment of the well; extract sample from the environment of the well and sense outside of the well; extract sample from the environment of the well and sense on microfluidics incorporated wells; a mechanism of preventing penetration of cells (like a cut-off filter) to the microfluidics that sample some media from the cellular environment and sense chemicals of the media; a mechanism of sampling media from the cellular environment and sensing exosomes; a mechanism of sensing exosomes in the entire well; a mechanism to clip the well holder to the moving stage to improve quality of continuous imaging. The biosensing-imaging system also enables at least the following sensing features: sensors are connected to the well (sidewall or bottom); sensors are inserted inside the wells (hanging); sensors are attached to the sidewalls (optical fibers); sensors are embedded in the wells (sidewall or bottom) and an imager performs multiple measurements of chemical analytes; methods for optimizing noise and cross-talk.

The multiple sensors placed directly into the wells (side and/or bottom) or on inserts that go inside the wells generate signals from biological samples and analtye(s) continuously, Envisioned system deals with sensor cross-talks besides noise related to, for example, intrinsic biological noise, electrode noise, changed threshold due to continuous monitoring, or optical noise caused by vibration due to mechanical movements.

In some embodiments, the wells reside inside a cell culture incubator in an environmentally controlled condition (as far as temperature, humidity, CO2/O2 level) and enables simultaneous imaging, metabolite measurements (pH, Oxygen), and impedance measurements of live cells using one integrated system continuously over hours to days without perturbation of live cells. Such polymodal multiplexing approach: a) eliminates rigorous signal to noise elevation and spectral subtractions processes that are associated with unimodal fluorescent multiplexing thus leads to higher precision, b) provides kinetics data through continuous measurements, c) minimizes labor and operation errors because one trained operator would run the system, d) provide multiple yet complementary information about live cells e) generates previously-unattainable cellular insight that enables informed decision making.

In particular, this approach can reveal new temporal/spatial correlations that would otherwise be missed by non-continuous measurements on fixed/dead cells or summing of single measurements by separate instruments or at different times on live cells.

The biosensing-imaging system also enables at least the following sampling features: sense sample within the well by inserting sensors into the well; extract fluid samples from the well and run through sensors that are external to the well; extract fluid samples from the well and run through sensors that are embedded in the well; extract fluid samples from the well and run through sensors that are embedded in the hanging inserts or as part of flow-through loop; methods for optimizing noise and cross-talk.

The approach used herein generates mass amounts of data without perturbing or changing the environment of the sample, which leads to better noise recognition and optimization. This ensures that a readout is not the result of under sampling and minute cell-intrinsic changes can be detected at higher probability. To optimize the placement of the sensors in multiple locations, profile spatial and temporal monitoring and measurement of O2 and pH can be profiled, taking into consideration the diffusivity of dissolved O2 (dO2) and ions such as H+ and OH− into cell culture nutrients according to Fick's Law. This profiling may help support use of a sensor in the wells described herein to provide information about the entire cell culture environment and subtle changes. Because cells make up a small volume of cell culture, changes in the concentration of oxygen in the media due to the cells will be minute and hard to distinguish from environmental noise.

In all cases, the cross-talk and noise will be quantified. If high cross-talk or occlusion of optical path inhibits optimal performance of the wells described herein for poly-biosensing and imaging, select sensors will be placed in different wells to accommodate fewer sensors per well, thus polybiosensing and imaging can be performed per plate that holds multiple wells.

In some cases, signal to noise can be managed by high localization of signal where the measurement is done at short wavelengths/high frequencies (in case of acoustic impedance sensing). In some cases, it is managed by having a-priori knowledge of where the cell is, so that one can focus the measurement to/about it. In other cases, averaging is done to sense a change in the cells out of a stable inert (non-changing) background.

FIG. 1 illustrates a conceptual diagram of a biosensing-imaging system in an exemplary implementation according to some embodiments. A biosensing-imaging system 10 is configured to be removably installable within an interior chamber 4 of an incubator 2. In some embodiments, the biosensing-imaging system 10 is configured to be positioned on a rack 6 within the interior chamber 4. The biosensing-imaging system 10 is coupled to an external electronic device 8. In some embodiments, the incubator 2 includes an interface (not shown) that enables electrical and network interconnects to be made between devices within the incubator 2, such as the biosensing-imaging system 10, and devices external to the incubator 2, such as the external electronic device 8. In other embodiments, the incubator can be a smaller chamber that controls pressure, temperature, humidity, O2, and CO2 level around the cell (not shown), in other words a small incubator may only cover the area around the cell culture chamber and not an entire area around the imager and other components of the biosensing-imaging system. In some embodiments, the external electronic device 8 is a host processing device, such as a computer or server. In some embodiments, the incubator in which the biosensing-imaging system is placed in replaced by a smaller incubator in which the slide, or slide and slider holder, is placed. In this case, the incubator can include a O2, CO2 port and modules for controlling temperature and humidity and pressure. The smaller sized incubator is made from a transparent material such as glass or plastic.

Figure 2:
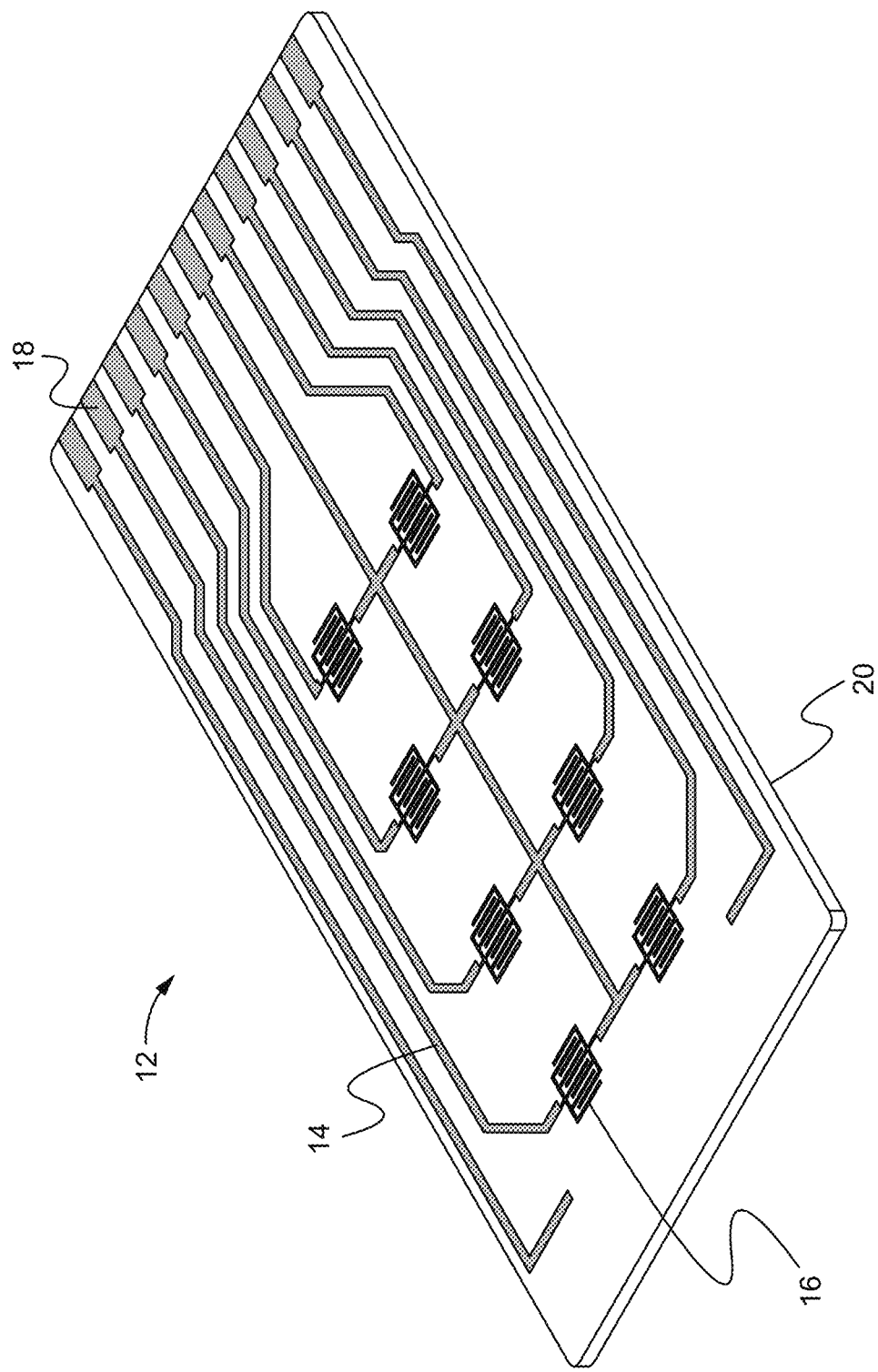
FIG. 2 illustrates a perspective view of an electrical interconnects substrate according to some embodiments.

The biosensing-imaging system 10 combines stand-alone disposable slides with disposable or non-disposable electronics each configured for placement and continuous use within the incubator. Such slides can include an electrical interconnects substrate and a well slide, FIG. 2 illustrates a perspective view of an electrical interconnects substrate 12 according to some embodiments. The electrical interconnects substrate 12 includes a substrate 20 onto which a plurality of electrically conductive interconnects 14, electrodes 16, and external connectors 18 are formed. The interconnects 14 provide electrical interconnectedness between the electrodes 16 and the external connectors 18. The substrate 20 is made of an optically transparent material, such as glass or plastic. The interconnects 14, the electrodes 16, and the external connectors 18 can be formed on a surface of the substrate 20. In some embodiments, the interconnects 14, the electrodes 16, and the external connectors 18 are printed onto the substrate 20. It is understood that the interconnects 14, the electrodes 16, and the external connectors 18 can be formed on the substrate 20 using any conventional techniques for forming and patterning electrically conductive material on a substrate including, but not limited to, photolithography. In some embodiments, the interconnects 14, the electrodes 16, and the external connectors 18 are made of gold, or an optically transparent material, such as ITO, silver ink, or carbon ink. Each electrode 16 can represent a single electrode or a plurality of connected electrodes, such as a plurality of interdigitated electrodes as shown in the circuit design of FIG. 2.

Figure 3:
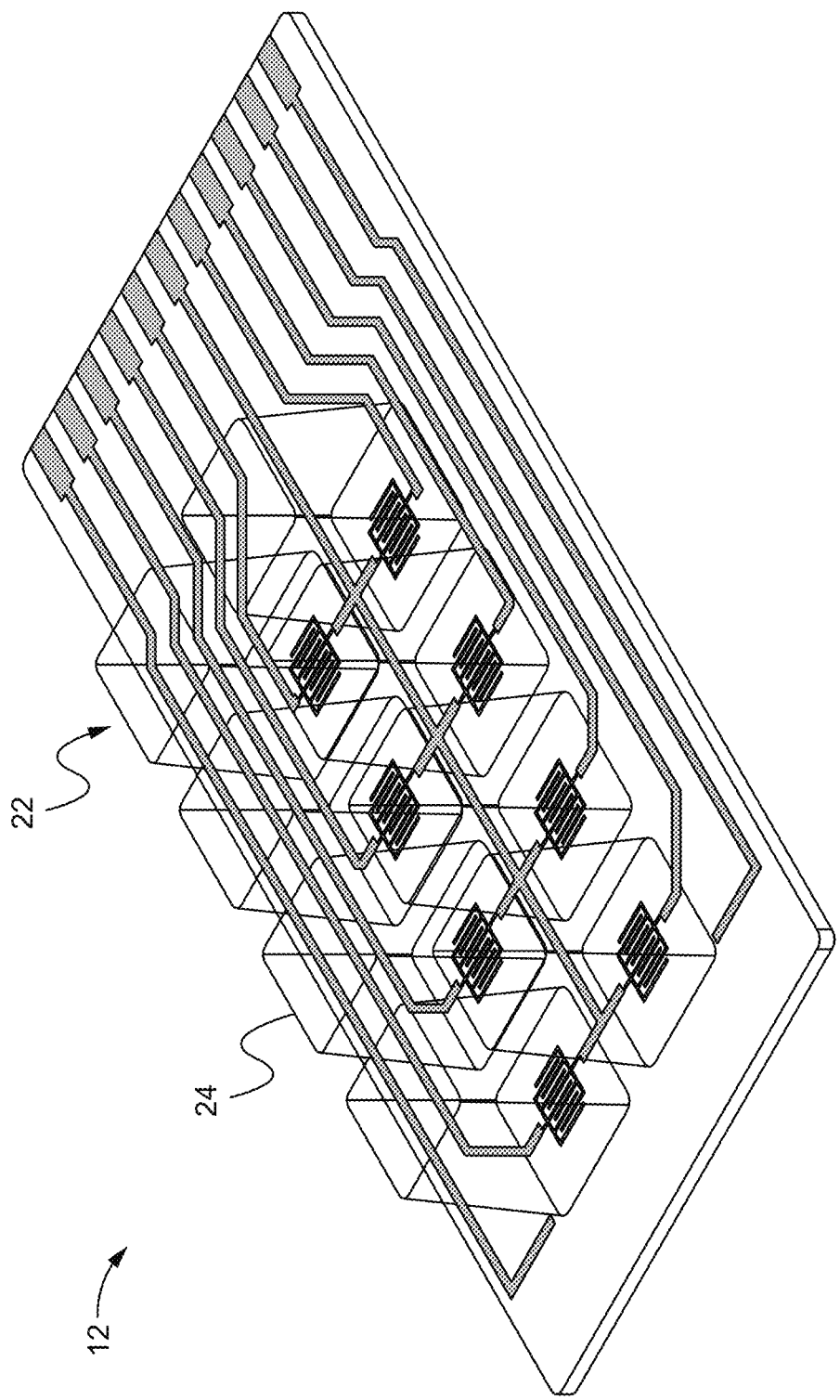
FIG. 3 illustrates a perspective view of a well slide attached to the electrical interconnects substrate in FIG. 2.

FIG. 3 illustrates a perspective view of a well slide 22 attached to the electrical interconnects substrate 12 in FIG. 2. The well slide 22 provides side wall and bottom wall structure for a plurality of wells 24. The well slide 22 is made of an optically transparent material, such as glass or plastic. The wells can be arranged in a variety of patterns and/or sizes, for example diameters and depths. It is understood that the well configuration shown in FIG. 3 is for exemplary purposes only, and that many alternative configurations are also contemplated. It is also understood that although the configuration shown in FIG. 2 shows wells having the same size and spacing, it is understood that slides can be configured with wells having different sizes and patterns. The exemplary well slide 12 has 2×4 array of individual wells 24. The well slide 24 and the electrical interconnects substrate 12 are configured such that at least one corresponding electrode 16 is aligned with each well 24. Although the configuration shown in FIGS. 2 and 3 shows a single electrode per well, it is understood that more than one electrode can be aligned with each well.

Figure 27:
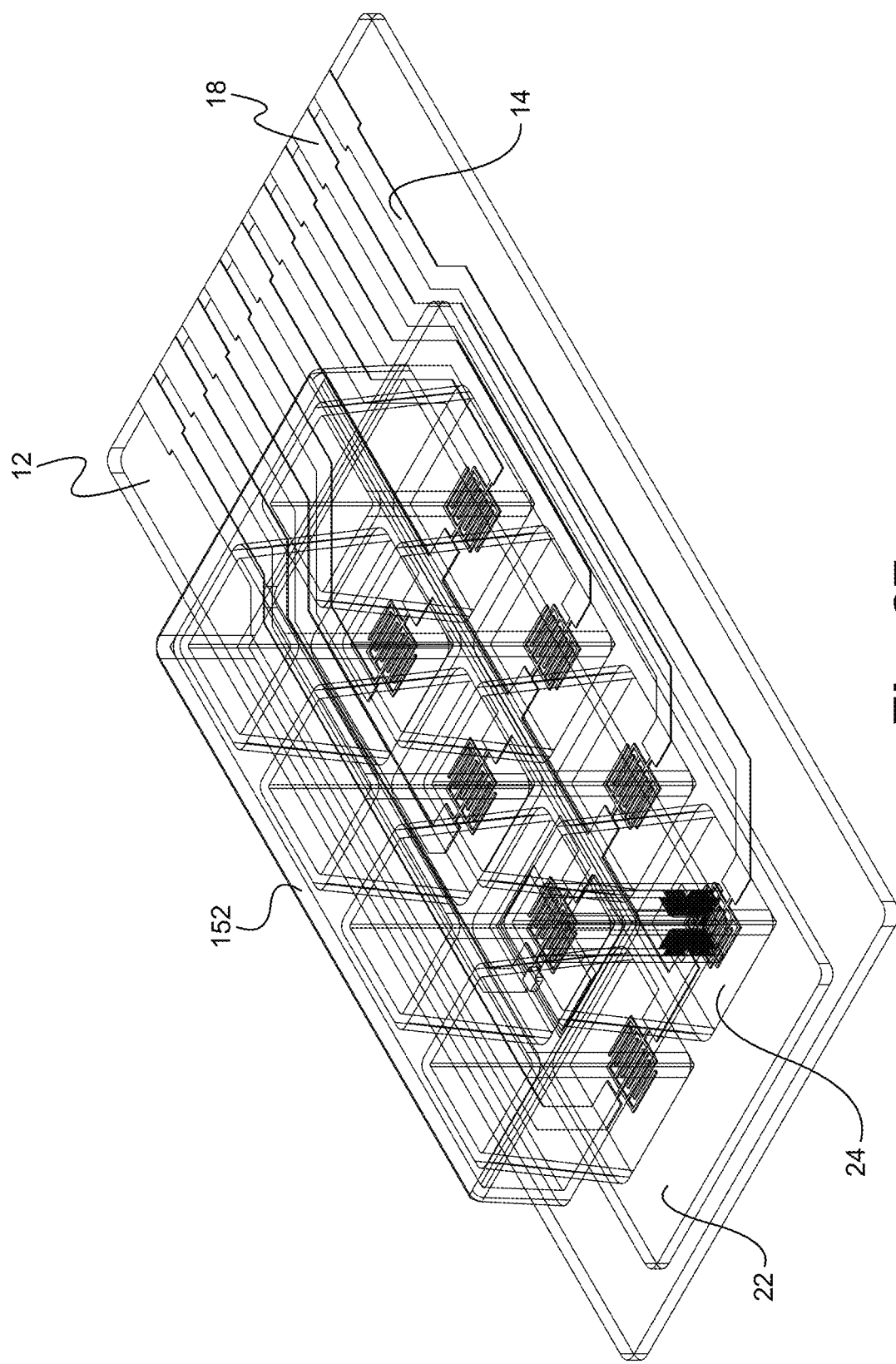
FIG. 27 illustrates a perspective view of a lid structure with inserts according to some embodiments.
Figure 28:
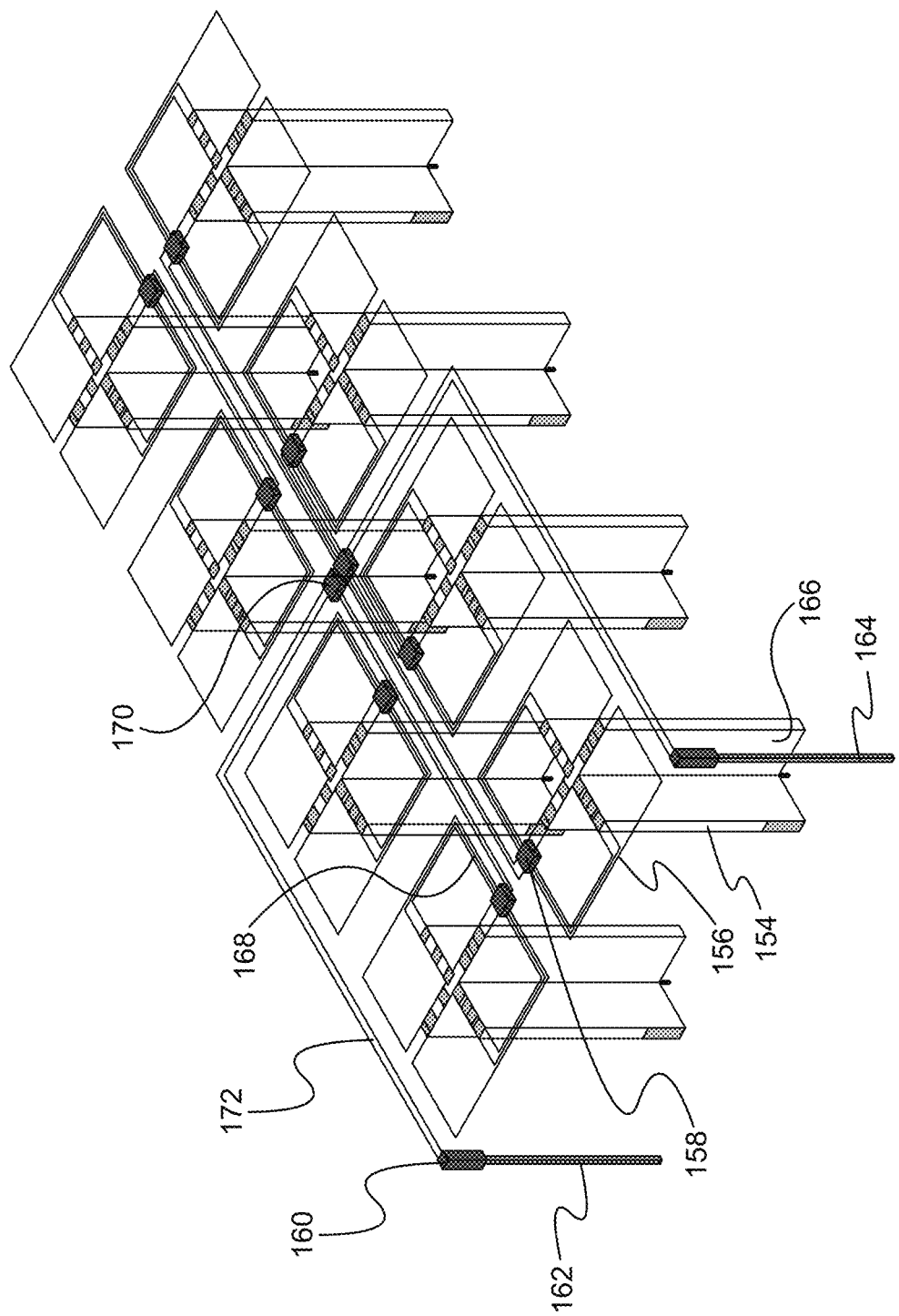
FIG. 28 illustrates a perspective view of the inserts, electrodes, interconnects, multiplexers, and common buses of the lid structure of FIG. 27.
Figure 29:
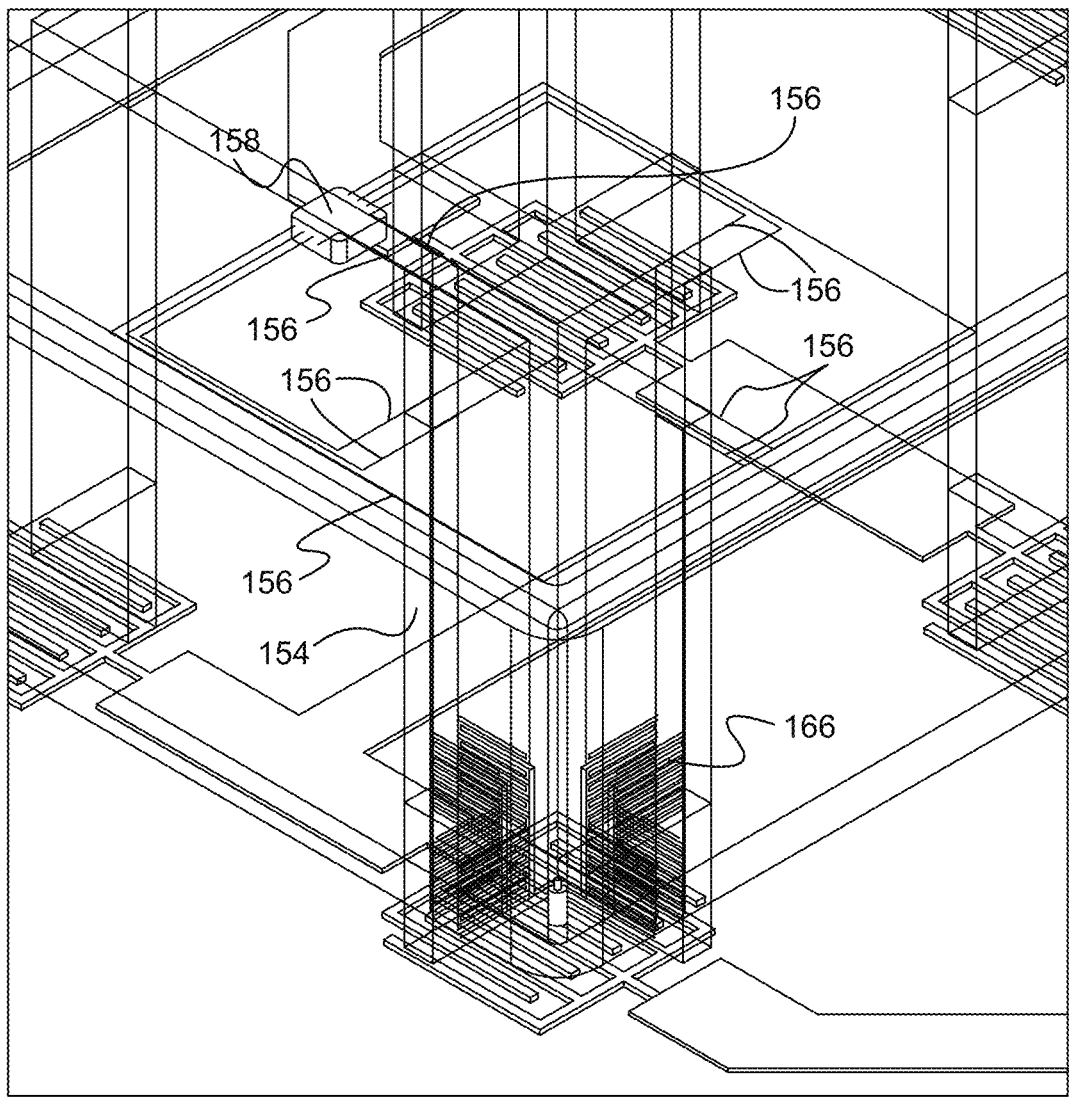
FIG. 29 illustrates an enlarged view of the lower right well and corresponding lid structure of FIG. 27 and corresponding interconnect structure shown in FIG. 28.

A lid structure is used to cover the well slide and corresponding wells. In some embodiments, the lid structure is configured to include inserts suspended from a bottom surface of the lid structure and extending into the well. The insert fits within the well so as to position active sensing components in physical contact with the well contents, such as a fluid sample and/or culture media. The inserts can have various sizes depending on the well size, and can include various types of sensors such as impedance, acoustics, chemical, optical, and environmental sensors. The inserts can be made from various materials and structures. In some embodiments, the lid structure including inserts are made of a transparent material. FIG. 27 illustrates a perspective view of a lid structure with inserts according to some embodiments. The exemplary lid structure 152 shown in FIG. 27 is configured for the exemplary well slide 22 having eight wells, and for there to be one insert per well. It is understood that the lid structure can be alternatively configured to accommodate well slides having different numbers of wells and for there to be more than one insert per well. In the exemplary configuration shown in FIG. 27, each insert is configured to divide the well into many small regions (mini-wells) within each of which the cell colony can grow. In the exemplary configuration shown in FIG. 27, each insert includes four walls which divides each well into four mini-wells. Each side of each mini-well can have one or more electrodes that can be used to monitor the impedance (impedance measuring modality) of the cell cluster within its confines. Electrically conductive interconnects are connected to each electrode formed on the inserts. The interconnects are formed on the insert wall and are routed on the top portion of the lid structure. Multiplexers can be used to form common buses The outputs of the electrodes attached to the inserts can be routed via the interconnects and multiplexers too one or more common buses to minimize external connections. FIG. 28 illustrates a perspective view of the inserts, electrodes, interconnects, multiplexers, and common buses of the lid structure 152 of FIG. 27. The view shown in FIG. 27 shows the lid structure without its support structure so as to better illustrate the inserts 154, electrodes 166, interconnects 156, multiplexers 158, 160, and common buses. FIG. 29 illustrates an enlarged view of the lower right well and corresponding lid structure of FIG. 27 and corresponding interconnect structure shown in FIG. 28. Each insert interconnect 156 connects an electrode 166 to a multiplexer 158. Each multiplexer 158 outputs to a common bus 168. Common buses 168 are connected to a multiplexer 170. Each multiplexer 170 outputs to a common bus 172. Common buses 172 are connected to a multiplexer 160. Each multiplexer 160 is connected to an interconnect rod 162. It is understood that alternative interconnect configurations can be implement that include more or less multiplexers, common buses, and interconnect rods than that shown in the exemplary configuration of FIG. 28. Each interconnect rod 162 is connected to an interconnect (not shown) on the electrical interconnects substrate 12. Although not shown in FIG. 27, such an interconnect can be formed similar to one of the interconnects 14 and include an external connector for external interconnection.

By using an insert, it is not needed for the cells to grow on top of electrodes that are placed on the bottom of the well, as described below. Instead, some of the cells grow in the mini-wells and can attach to an electrode on one of the four sides of the mini-well. The insert is intended to better sense 3D cell clusters that are suspended, for example cell clusters not in contact with the bottom surface of the well. The addition of the mini-wells allows much more granularity to measure the characteristics of smaller regions or volumes of a cell colony. The insert form factors and sizes are modular. The insert can be designed according to many different dimensions, and multiple sensor modalities can be implemented. The surface of inserts can be functionalized with biocompatible chemical moieties to enhance long-term stability and biompatibility. The surface of inserts can be functionalized selectively with inert chemical moieties to attenuate signal of surrounding regions to the sensing electrodes and thus improve signal to noise ratio.

Measurements in 3D gels such as Matrigel will suffer from very substantial signal attenuations over distances of even ones or tens of microns and from additional large losses at the boundaries of the well. For example, acoustic attenuation loss across a 10 mm well can be over 100 dB. From a mechanical perspective, Matrigels maybe highly variable materials, varying by a factor of four in acoustic impedance. The base Youngs modulus can vary by several orders of magnitude depending on mix concentration, and vary significantly over time as well.

In some cases, extracting cellular features require mapping the entire Matrigel matrix at very high resolution, and in a time constant shorter than the variability of the Matrigel over time, in order see the cells and differentiate them from local changes in the Matrigel itself. Regardless, features such as mechanical signature of cells that are just introduced to drugs can be sensed with high confidence, because time of mechano response to drug can be an indicator of a permanent or transient change, irrespective of resolution and sensitivity of signal.

It is understood that the inserts can be configured to use different sensor types or to include additional different sensor types. Each insert includes the capability of accessing various sensors that are positioned on it and multiplex the corresponding sensor signals to a minimal number of external connections. The variety of different sensor types can be coupled to the inserts, and if desired, to the well side walls and bottom wall for 2D and 3D continuous sensing of multiple different modalities including all of the different modalities described herein.

The lid structure can be incorporated as part of a sensor positioning assembly (SPA) or other lid structure of the types described below. As such, the lid structure can include on or more openings per well to enable a probe to be inserted through the hole and into the well, such as described below.

Figure 4:
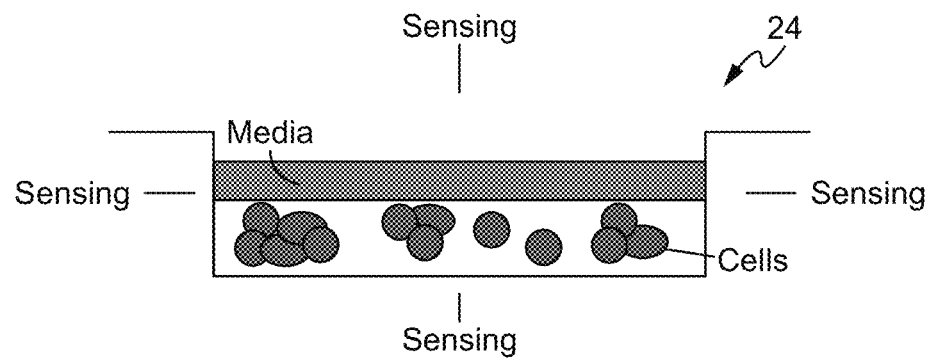
FIG. 4 illustrates a cut-out side view of an exemplary well having a biological sample to be sensed.

The biosensing-imaging system 10 is designed to sense multiple different characteristics of fluid sample within a given well. FIG. 4 illustrates a cut-out side view of an exemplary well having a biological sample to be sensed. The biological sample is suspended in a gel, and covered by a culture media. Sensing can be performed from above, below, and/or the sides of the well. For example, electrical sensing can be performed by electrodes (FIG. 2) included on the electrical interconnects substrate (FIG. 2) positioned under the bottom wall of the well. Additional electrodes can also be positioned on an interior and/or exterior surface of the well side walls. The electrodes enable impedance measuring. Optical sensing can be performed by optical interrogation, which may include providing illumination from the top of the well (FIG. 6), through the well side walls, and/or from the bottom of the well (FIG. 5), and sensing light by an optical reader positioned underneath the well bottom well. Acoustic sensing can be performed by attaching one or more acoustic sensors (not shown) on an interior and/or exterior surface of the well side walls and/or well bottom wall. Chemical sensing can be performed by attaching one or more chemical sensors (not shown) on an interior and/or exterior surface of the well side walls and/or well bottom wall. There are multiple use cases for which this is important. The cells are living organisms and modify their environment from a chemical perspective. It is important to be able to measure the change in chemistry that is caused by these cells. The chemistry to be measured can include, but is not limited to, pH, selective ions such as Chloride, Sodium, Potassium, Nitrate, Calcium, O2, CO2, cellular metabolites, reactive oxygen species (ROS), sugars and glucose, fat and other relevant chemistries such as secreted glycosaminoglycans and exosomes. In some embodiments, the chemical sensors are ISFETs (ion-sensing field-effect-transistor) for measuring ion-concentrations in the fluid sample. The electrical signals output from the ISFETs can be translated to pH measurements. In other embodiments, the chemical sensors are chemical sensor dots whose color changes based on the chemistry they are exposed to. The chemical sensor dots can be interrogated optically. Similar to above, each chemical sensor dot can be tuned for sensitivity to one type of chemistry and for a specific range of concentrations. These chemical sensor dots can be printed on the bottom surface of a well and their color can be measured by the imaging unit. Chemical sensing can also be performed using electrochemical sensors, such as an integrated circuit configured to electrically measure chemical characteristics, for example pH and O2, and output a corresponding electrical signal. Such an integrated circuit has a sensing portion and an external connection pad. The integrated circuit can be positioned on the bottom or side wall of the well such that the sensing portion is immersed in either the fluid sample or culture media. The well can be adapted to include an electrical interconnect for coupling to the integrated circuit external connection pad, which in turn can be connected to an external electronic device, such as an imaging unit described below. Other types of sensors can be positioned on the well bottom and/or side walls and immersed within the fluid sample or the culture media to sense secretomes. Such a secretome sensor can include specific antibodies that attach to specific secretomes to be sensed, which when joined fluoresce or other modalities. This fluorescence can be sensed and measured using appropriate optical interrogation. It is understood that other sensing can be performed using alternative types of sensors. In some embodiments, sensors are not restricted to the interior surfaces of the well side and bottom walls, and can be inserted and suspended in either the biological sample or the culture media, as described in greater detail below.

Figure 5:
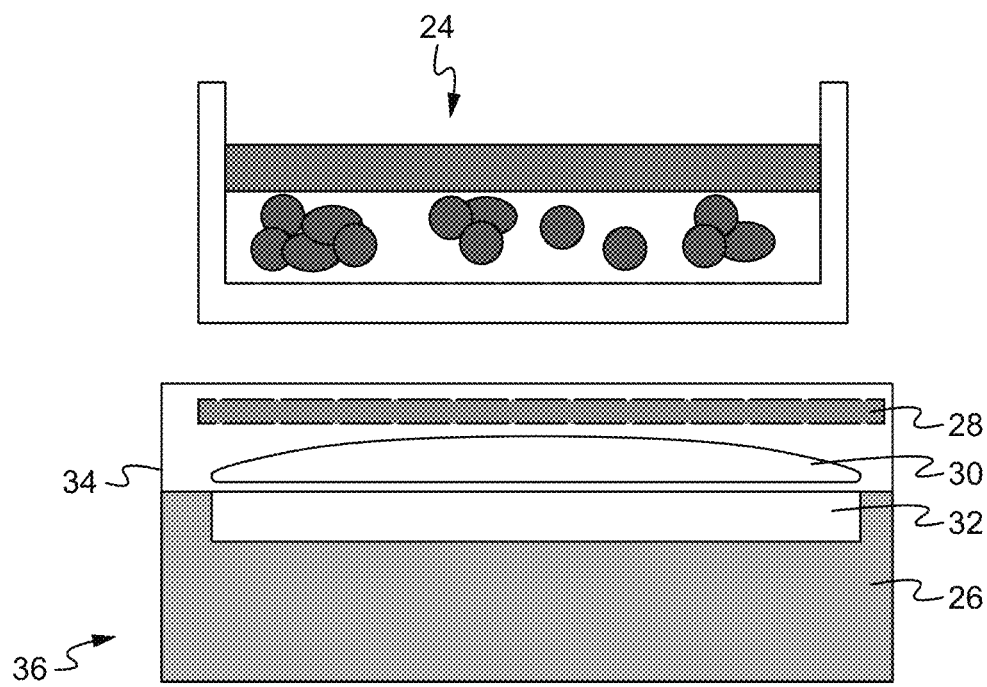
FIG. 5 illustrates a cut-out side view of a biosensing-imaging system including an imaging unit according to some embodiments.
Figure 6:
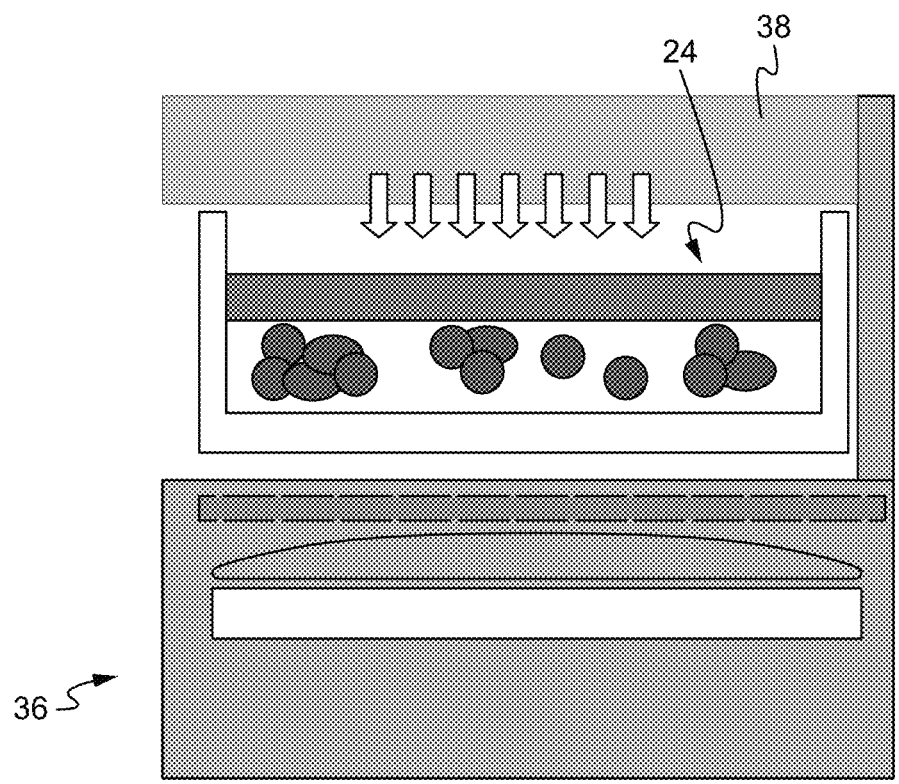
FIG. 6 illustrates a cut-out side view of a biosensing-imaging system including an imaging unit according to other embodiments.

The biosensing-imaging system 10 also includes non-disposable electronics, which can be configured to perform optical interrogation of each well and related data capture, as well as provide electronic circuitry for implementation of impedance measuring using electrodes and acoustic measuring using acoustic sensors coupled to each well. The non-disposable electronics can include components such as a reader, a filter, optical components, and a camera. The reader can also include additional control and processing circuitry, such as actuators and actuator control circuitry, system control, and data and image processors. The optical components can include any number of optical components configured to receive light from the well and to optically transmit the received light to an imaging sensor within the camera. The filter, the optical components, and the camera are collectively referred to as an imaging unit. FIG. 5 illustrates a cut-out side view of a biosensing-imaging system including an imaging unit according to some embodiments. The exemplary configuration shown in FIG. 5 is applied to a single well but can readily be applied to each well in a well slide. The imaging unit 36 includes a reader 26, a filter 28, optical components 30, and a camera 32. The reader 26 is electrically coupled to the external connectors 18 (FIG. 2) of the electrical interconnects substrate 12 (FIG. 2). In some embodiments, the reader 26 includes pogo pins arranged to mate with the external connectors 18. In this case, the external connectors can be flat contact pads. In other embodiments, the external connectors 18 are configured as a plug or other type of adapter, and a connecting wire with appropriate configured adapter can be used to connect the external connectors 18 to the reader 26. The biosensing-imaging system 10 also includes a light source used to illuminate the interior of each well and enable optical interrogation of the fluid sample stored therein. In some embodiments, a light source is positioned below the well, included as part of the camera 32. In other embodiments, the light source is positioned above the well, such as the light source 38 positioned over the well 24 in FIG. 6. In still other embodiments, the light source is positioned on the side or angular to (not shown). The well side wall The light source can be in different form and type such as LED, laser, or light sheet.

In order to determine the color of any of the aforementioned sensors, these sensors need to be illuminated In some embodiments, the sensors are illuminated by the light applied generally to the rest of the interior of the well, such as by the light source positioned below the well or above the well. In this case, reflectance characteristics of the sensors are measured. If it is intended to measure the optical transmission characteristics of the sensors, then a light source that illuminates the sensors from above is used and the resulting transmitted light is sensed at the bottom side of each well. In other embodiments, light is directed through the well side walls onto the sensors.

Figure 7:
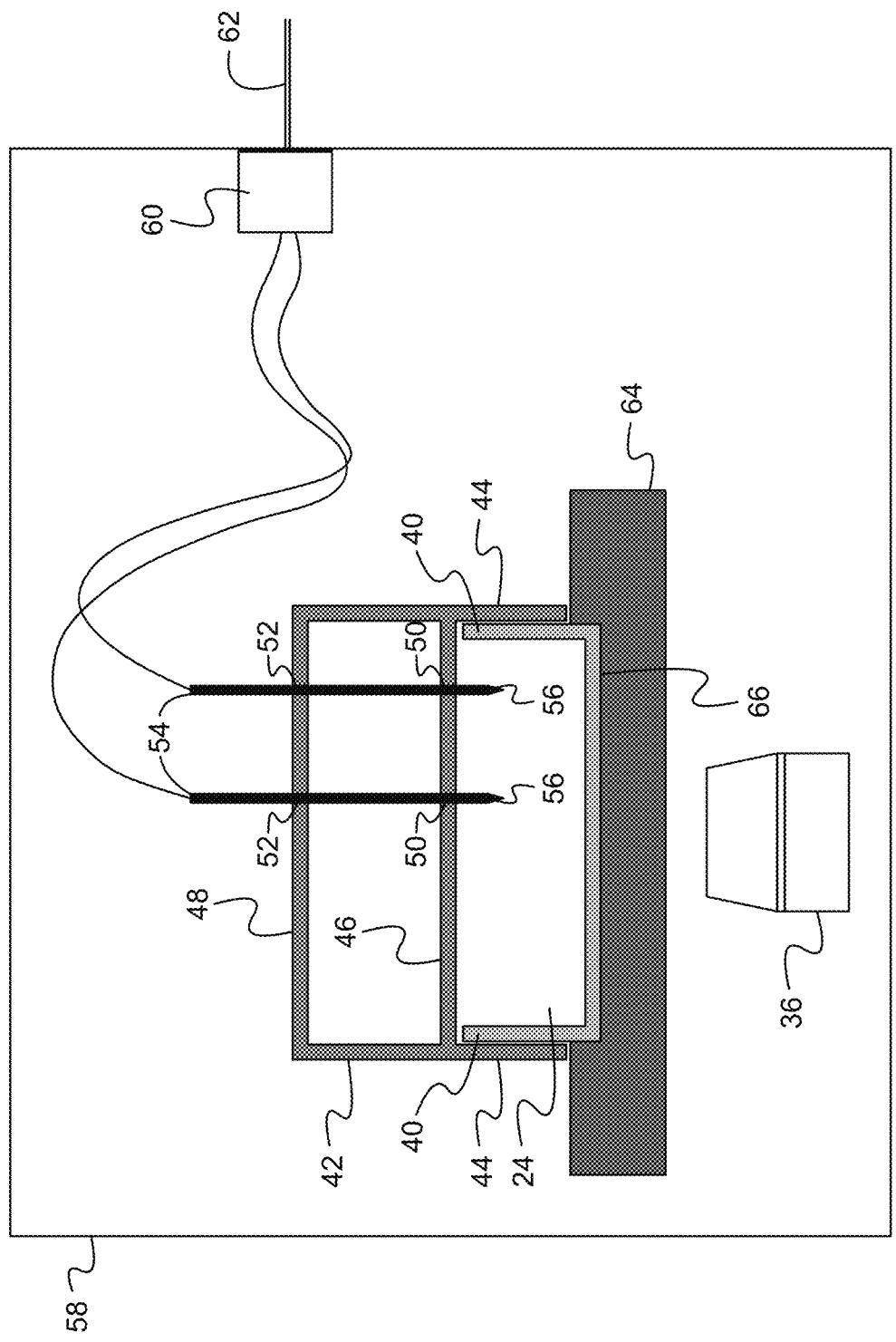
FIG. 7 illustrates a cut-out side view of the biosensing-imaging system including a sensor positioning assembly (SPA) according to some embodiments.

In the exemplary embodiment described above, the imaging unit includes the filter, the optical components, the light source, and the camera. In general, the imaging unit includes light sources, optical components, light sensors, and electronic circuitry used to generate and direct light into the well, and to receive and image resulting light, reflected and/or transmitted. An optical system includes the imaging unit, electronic circuitry used to process image signals resulting from the sensed received light, mounting and movement mechanisms, and electronic circuitry used to control the imaging unit and the mounting and movement mechanisms. The biosensing-imaging system 10 also includes a sensor positioning assembly (SPA) configured to attach to the well slide. The SPA enables one or more sensors to be precisely positioned within each well of the well slide. The SPA is configured such that the optical system including the imaging unit is still enabled to optically interrogate the wells. FIG. 7 illustrates a cut-out side view of the biosensing-imaging system including an SPA according to some embodiments. The exemplary configuration shown in FIG. 7 is applied to a single well but can be readily applied to a well slide having multiple wells. The well slide including the well 24 and the electrical interconnect substrate (not shown) are mounted and secured in place within a recess or opening 66 in a mounting nest 64. The mounting nest can also be referred to as a baseplate. In the exemplary configuration shown in FIG. 7, the area 66 is a recess. In this case, the entire mounting nest 64 or a portion of the mounting nest 64 underneath the well slide is made of optically transparent material to enable optical interrogation, such as by an imaging unit 36, of the wells from underneath the mounting nest 64. Alternatively, the area 66 includes an opening that passes through an entire thickness of the mounting nest 64 to enable optical interrogation of the wells from underneath the mounting nest 64. In this case, a portion of the area 66 is a recess, such as an area surrounding or on both lateral sides of the opening, this recess area provides a mounting platform onto which the well slide and electrical interconnect substrate rest and may be made of optically transparent material. An SPA 42 is mounted to the well slide. In some embodiments, an SPA includes a lid and a mounting structure for securing the SPA in place relative to the well slide. The SPA 42 shown in FIG. 7 only shows the lid portion. The lid includes lid side walls 44, a lid mid-wall 46, and a lid top wall 48. The lid is aligned with the well 24 such that the lid mid-wall 46 rests atop well side walls 40, and the well side walls 40 fit within the lid side walls 44 to provide lateral stability of the lid relative to the well slide. The lid mid-wall 46 has a plurality of holes 50 and the lid top wall 48 has a plurality of holes 52. The holes 50 and 52 are configured so as to allow probes 54 to be inserted into the well 24. Each probe 54 has a sensor 56 attached to a distal end, or proximate to the distal end. In some embodiments, each probe includes an outer protective sheath surrounding an optical fiber, and the sensor is attached to the end of the optical fiber. In some embodiments, the sensor is implemented as a fluorescent dye coated on the end of the optical fiber. The type of dye is selected so that a specific chemistry to be sensed, such as pH or O2, and selective ions attaches to the dye. The optical fiber is connected to a measurement device that can emit light at specific wavelengths. A fluorescence process can be used in which the measurement device directs a first wavelength of light, via the optical fiber, to the dye coated end of the optical fiber, which results in a fluorescent emission in the presence of the attached chemistry. The fluorescent emission is at a second wavelength different than the first wavelength. The optical fiber transmits the fluorescent emitted light back to the measurement device. In other embodiments, the probe can include two separate optical probes, one optical fiber that is dye coated and configured to emit light at the first wavelength to the dye, and another optical fiber configured to transmit the fluorescent emitted light back to the measurement device. By way of example, the range of excitation wavelength (first wavelength) for O2 sensing is 500-650 nm and the range of emission wavelength for O2 sensing is 575-775 nm, and the range of excitation wavelength (first wavelength) for pH sensing is 460-650 nm and the range of emission wavelength for pH sensing is 525-700 nm.

The distal end of the optical fiber extends beyond the outer sheath. The outer sheath is made of a transparent material that minimizes, if not prevents, optical occlusion due to the probe. Minimizing, if not preventing, optical occlusion within the well enables simultaneous multi-modal functionality, such as simultaneous use of the probes (chemical sensing) and optical interrogation of the well interior (optical sensing). Each probe can extend, or be interconnected to extend, external to an environmental box, such as the incubator 2 in FIG. 1, through an access port 60 to an external interconnect 62. The external interconnect 62 can be connected to an external electronic device or an external communications network. In this manner, data signals output from the sensor of the probe can be communicated to an external electronic device or network for further processing or routing. Various types of sensors, such as voltage sensitive dye, can be uses instead of fluorescence based sensor for chemical sensing.

Figure 8:
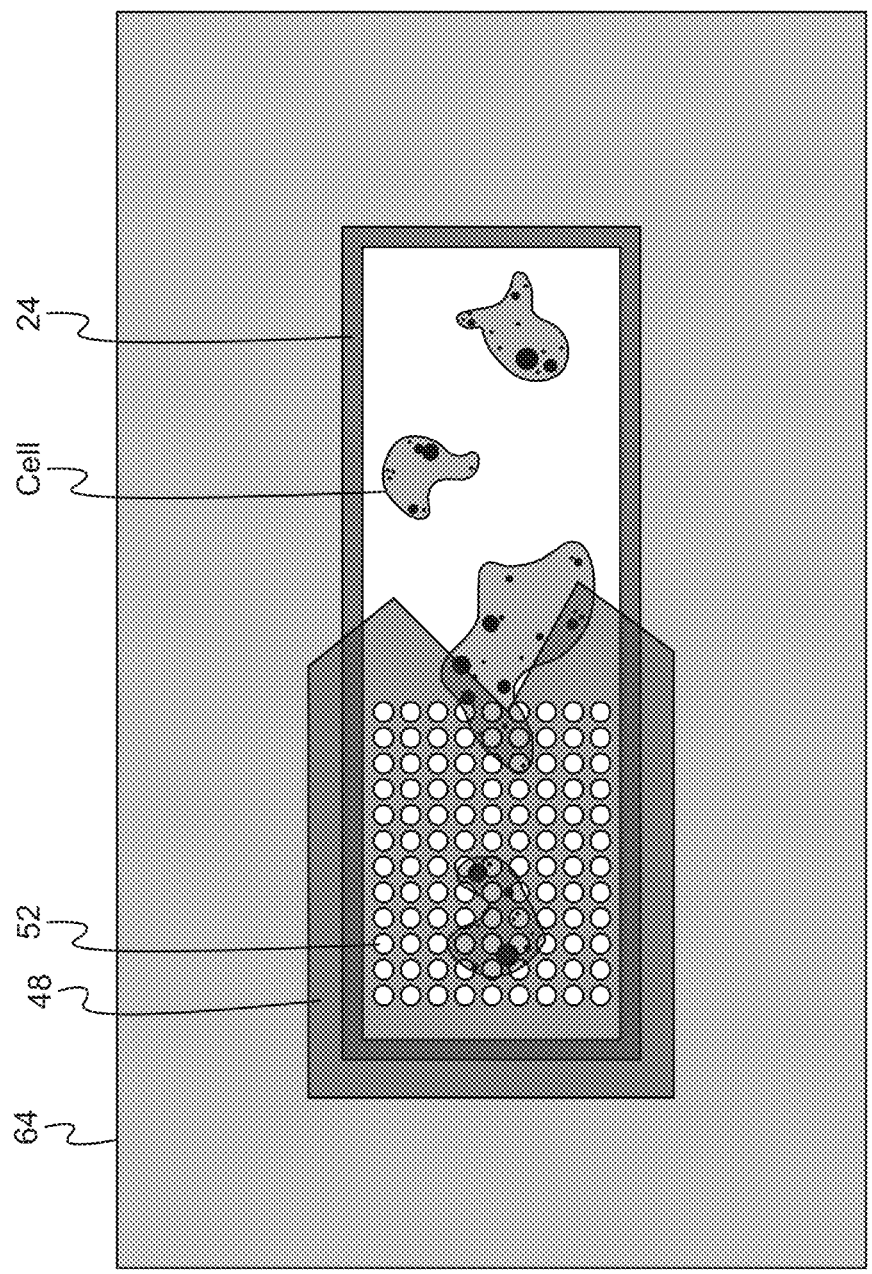
FIG. 8 illustrates a top down view of the biosensing-imaging system of FIG. 7 with an exemplary configuration of the SPA.
Figure 9:
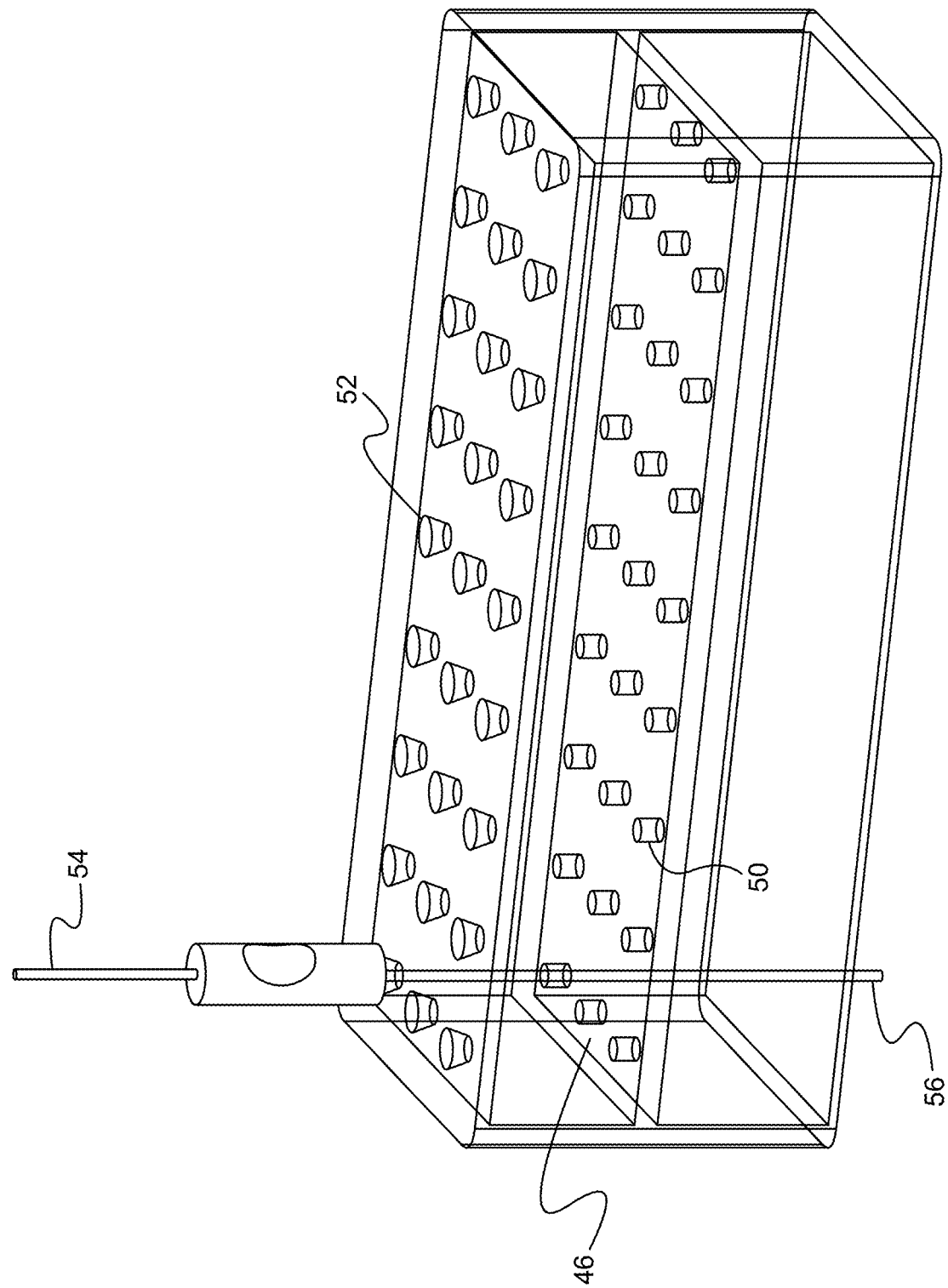
FIG. 9 illustrates a perspective view of a portion of the SPA with vertically aligned holes in the lid top wall and the lid mid-wall.

Each probe 54 can be inserted a controllable distance into the well 24 such that the sensor 56 can be positioned to any depth (Z-direction), either within the fluid sample or culture media. The number and positions of the holes 50 and 52 can be configured to provide varied access to the well within the horizontal plane (X-Y plane) of the well. FIG. 8 illustrates a top down view of the biosensing-imaging system of FIG. 7 with an exemplary configuration of the SPA 42. The right hand side of the lid is not shown to illustrate the underlying well 24. In the exemplary configuration shown in FIGS. 7 and 8, each hole 52 in the lid top wall 48 is vertically aligned with a corresponding hole 50 in the lid mid-wall 46. This alignment provides a vertical insertion angle for each probe 54 into the well 24. FIG. 9 illustrates a perspective view of a portion of the SPA 42 with vertically aligned holes in the lid top wall and the lid mid-wall. FIG. 9 also shows holes 52 having an exemplary conical configuration so as to aid insertion of the probe 54. It is understood that alternative configurations of the holes in the lid top wall and the lid mid-wall are also contemplated where the holes are not vertically aligned. In this manner, a probe can be inserted at a non-vertical insertion angle into the well. As also shown in FIG. 9, the holes in the lid walls are symmetrically arranged in rows and columns. It is understood that the holes can be alternatively arranged, symmetrically or non-symmetrically. It is also understood that the number and density of holes can be different than that shown in FIGS. 8 and 9. In general, the number, density, pattern, and relative alignment of the holes in both the lid top wall and the lid mid-wall can be application specific and configured so as to enable insertion of one or more probes through the lid top wall and the lid mid-wall and into the well, where each probe is inserted through one hole in the lid top wall and one hole in the lid mid-wall.

Although the sensing capabilities described above are directed to sensors inserted into the well using an inserted probe, it is understood that biosensing-imaging system can be configured to include any combination of a variety of different sensor types including, but not limited to, immersion probes, chemically sensitive films/foils/dots, pass-through sensors, or a hybrid system. In regard to immersion probes, a probe-configuration sensor (long thin 'tube/needle') can be chosen for each measurement mode. Cables/wires are connected, as appropriate, to base stations/readers/data loggers. The immersion probes are selected so that each, including any larger heads/bases, can be physically put into the well at the same time. Well lids are configured to cover the rest of the well during extended measurement time periods. In regard to chemically sensitive films/foils/dots, consumable sensor films/foils or semi-durable sensor dots can be attached to well bottom or sides as sensors. Films/foils/dots are selected so that they fit on select areas of well bottom and/or sides, and/or film/foil can be cut to fit to target areas on well bottom and/or sides, or placed in separate wells in case of high cross-talk in wells of smaller sizes. In this case, polysensing and imaging is done per plate (that holds multiple wells).

Figure 26:
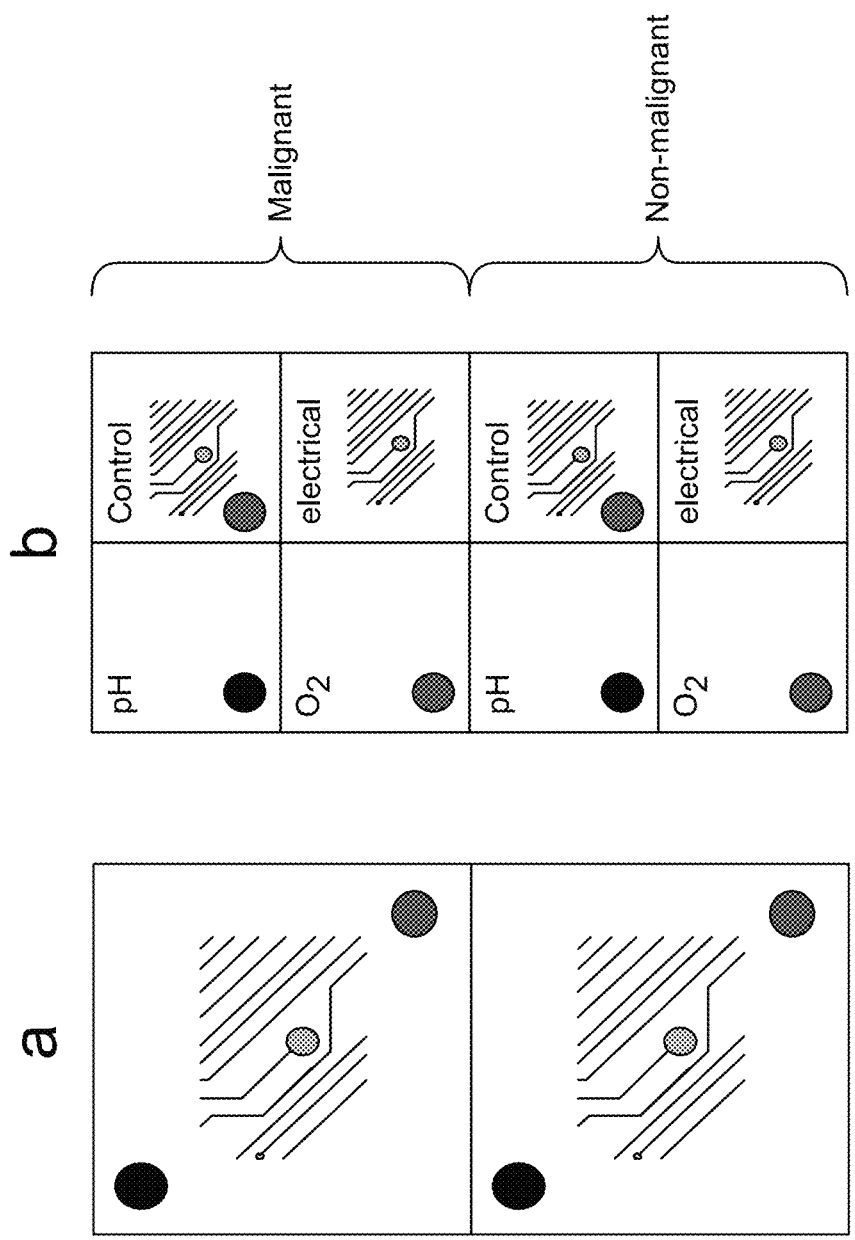
FIG. 26 illustrates an exemplary implementation of a multi-well form factor with individual sensors in each well of an 8 well design compared with that of a 2 well design.

FIG. 26 illustrates an exemplary implementation of a multi-well form factor with an individual sensor in each well of an eight well design compared with that of a two well design with multiple different sensor types in each well. FIG. 26 demonstrates the use of polymodal sensing by either performing all measurements in one well, for example an O2 sensor, a pH sensor, and an electrical sensor from the same well (left wells labeled A), or a single measurement per each well (right wells labeled B). In this manner, polysensing can be performed on one well or polysensing per plate that has a multiple wells by offering single measurement on each well in plate. In the exemplary application shown in FIG. 26, four wells are used for malignant cell sample and four wells are used for non-malignant cell sample. Three of the four wells are used for sensing one of three modalities (pH, O2, and electrical) and are compatible with imaging. The last of the four wells is used as a control well, without cells, and can be used for baselining and noise reduction. One of the control wells has impedance and oxygen and the other control well has impedance and pH.

The films/foils/dots/can be read (sensed) with corresponding optical readout sensors, or read-out cameras plus image interpretation software to compute target chemistry numbers. In regard to pass-through sensors, the biosensing-imaging system can be re-configured to slowly circulate the nutrient layer across the fluid sample, e.g. Matrigel, with a pump. While in the pump line, the circulating nutrient flows past in-line sensors and readings are taken. In regard to the hybrid system, a mindful combination of more than one of the above sensor types can be used.

In some embodiments, a central imaging unit, such as a modified imaging unit described below, can be used to measure from films/foils/dots placed on the side wall, top of bottom of the plate to visualize and quantify the signal from films/foils/dots.

Figure 10:
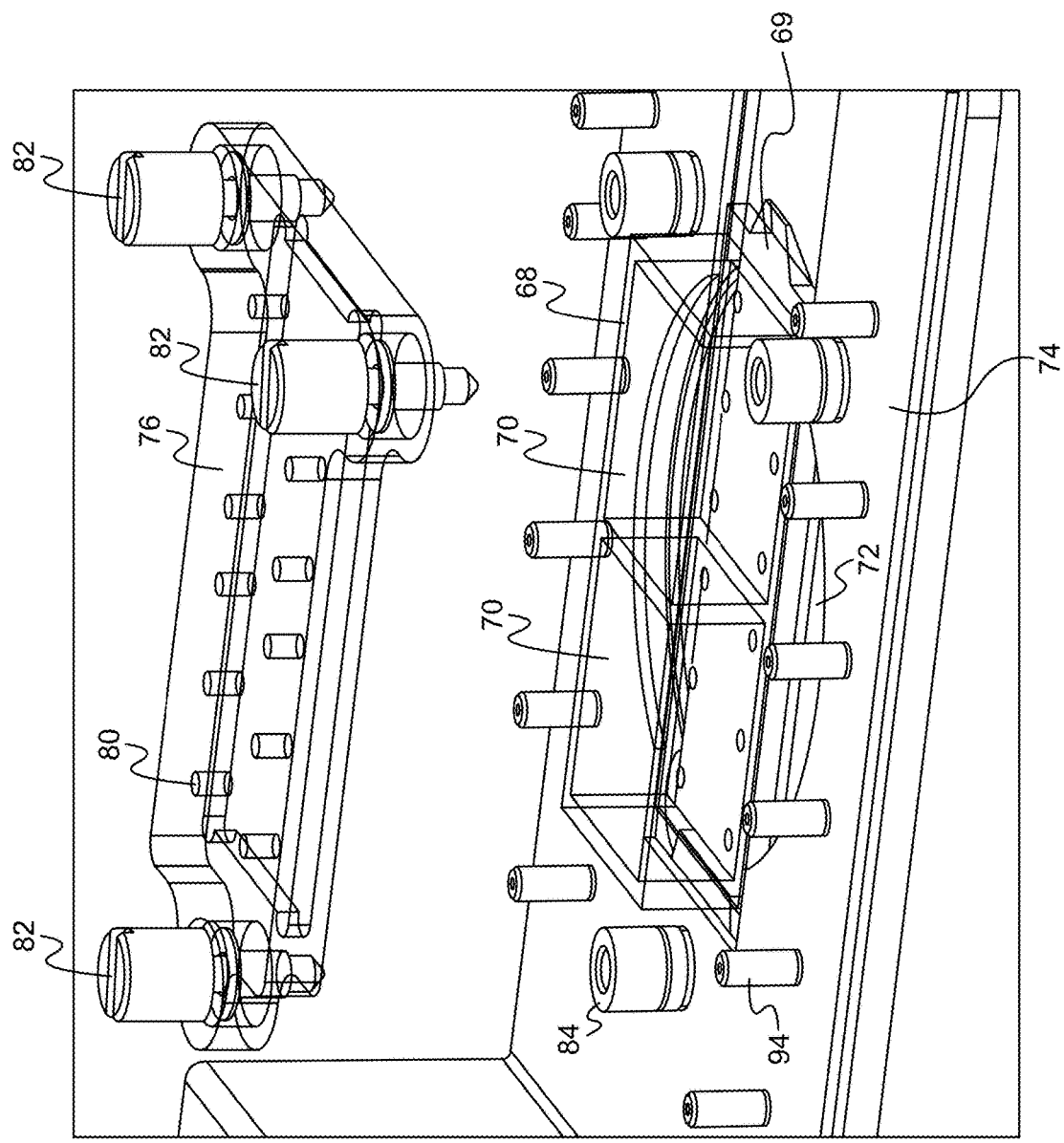
FIG. 10 illustrates an exploded perspective view of an alternative lid structure, well slide, and mounting nest according to some embodiments.
Figure 11:
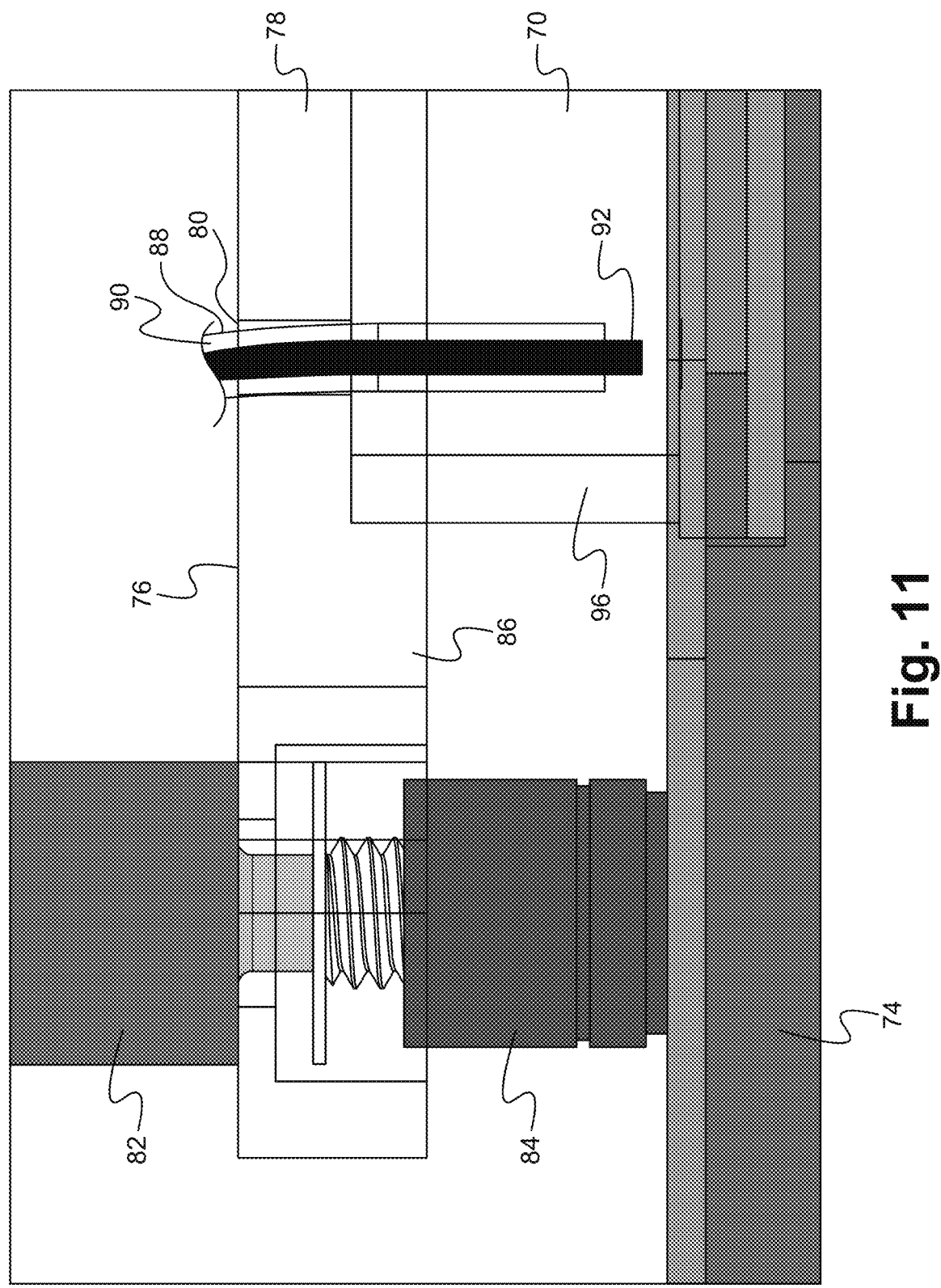
FIG. 11 illustrates a cut-out side view of a portion of the lid structure, well slide, and mounting nest of FIG. 10, as assembled.

In some embodiments, the lid of the SPA can be configured to be mounted to the mounting nest to better secure the relative position of the SPA to the well slide. Additionally, the lid can be alternatively adapted so as to eliminate the two separate lid top wall and lid mid-wall, and instead have a single lid cover with access holes to the underlying wells. FIG. 10 illustrates an exploded perspective view of an alternative lid structure, well slide, and mounting nest according to some embodiments. In the exemplary configuration shown in FIG. 10, a well slide 68 has two wells 70. It is understood that alternative configured well slides can be used that include more or less than two wells. FIG. 11 illustrates a cut-out side view of a portion of the lid structure, well slide, and mounting nest of FIG. 10, as assembled. The well slide 68 is positioned within a recess 72 of a mounting nest 74. The lid 76 includes a lid cover 78 having a plurality of holes 80 that provide access to each of the wells 70. When assembled, as shown in FIG. 11, the lid cover 78 rests atop the well side walls 96 with lid side walls 86 extending below the lid cover 78 and external to the well side walls 96. The mounting nest 74 includes a plurality of lid mounting stands 84 to which the lid 76 is mounted via lid attachments 82. In some embodiments, the lid attachments 72 are thumb screws configured to screw into the lid mounting stands 84. It is understood that the lid attachments and lid mounting stands can be alternatively configured, such as clamps, latches, ball and socket, snap buttons, and the like. The number, density, and pattern of the holes in the lid can be application specific and configured so as to enable insertion of one or more probes through the lid cover and into each well. FIG. 11 shows an exemplary probe 88 inserted through one of the holes 80 and into the well 70. The exemplary probe 88 can include an outer sheath 90 and an inner optical fiber 92 that includes a sensor at its distal end. The optical fiber 92 extends beyond the outer sheath 90 such that the distal end including the sensor is exposed within the well 70.

The mounting nest can also be adapted to include mounting mechanisms for mounting and securing the probes in place. Mounting blocks, stands, brackets, or the like can be used. In the exemplary configuration shown in FIG. 10, a plurality of mounting stands 94 are attached to the mounting nest 74. Each mounting stand 94 can be used to hold, attach, or otherwise secure a corresponding probe in position relative to the well slide mounting in the mounting nest 74. In the exemplary configuration shown in FIG. 10, twelve mounting stands 94 are positioned around the two-well well slide, which enables six separate probes (FIG. 12) to be inserted into each well. It is understood that additional configurations that enable more or less probes to be inserted into each well.

Figure 12:
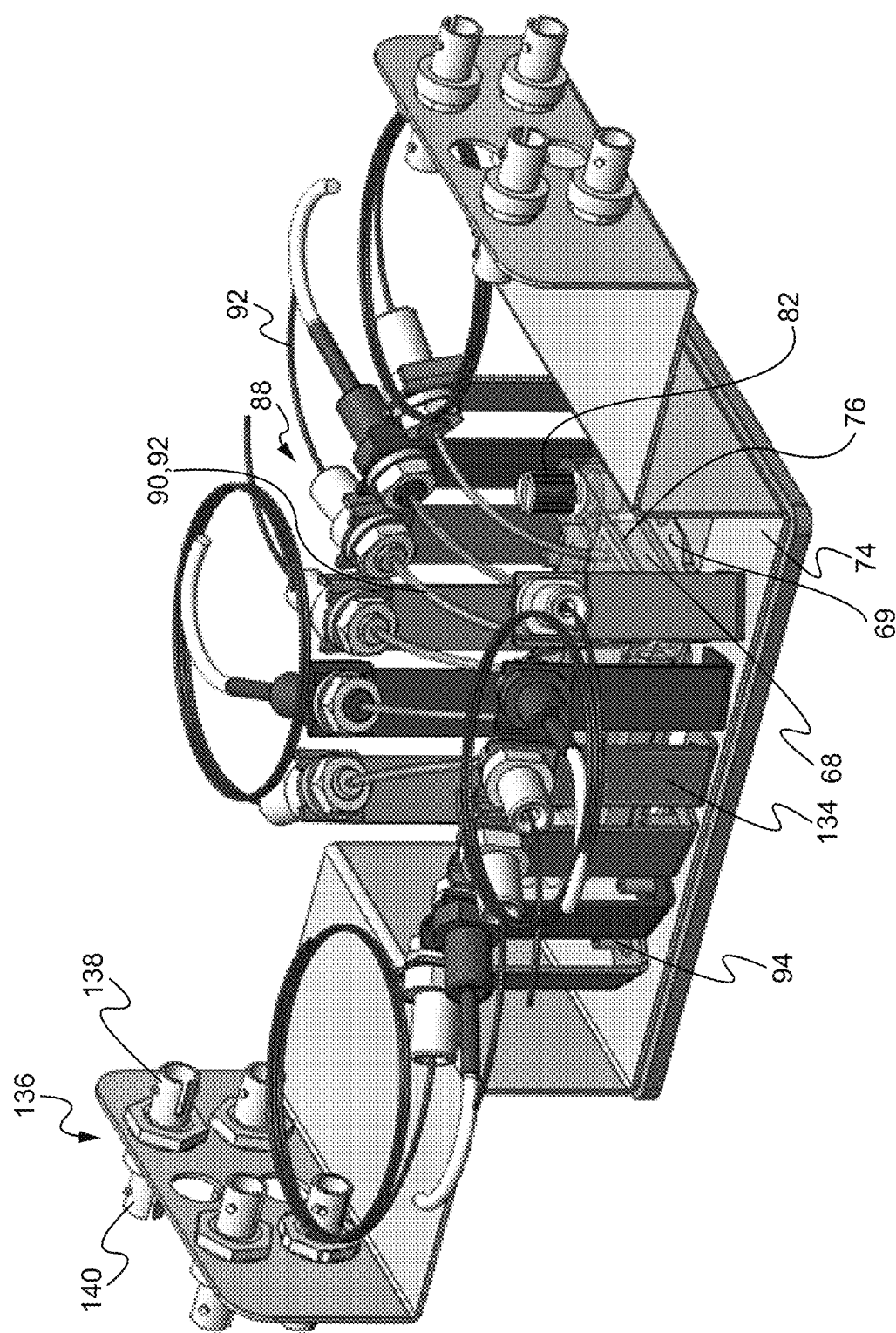
FIG. 12 illustrates a perspective view of the probes mounted to the structure of FIGS. 10 and 11 according to some embodiments.

FIG. 12 illustrates a perspective view of an SPA that includes the probes mounted to the structure of FIGS. 10 and 11 according to some embodiments. A plurality of probe mounts 134 are attached to the mounting nest 74 via the mounting stands 94. One probe 88 is mounted to each of the probe mounts 134. An end of each optical fiber 92 is connected to a coupling adapter (not shown), which can be mated to a coupling adapter 138 of one of the couplers 136. Each coupler 136 also includes a coupling adapter 140 for connecting to a coupling adapter connected to an external interconnect 132, such as another optical fiber or other type of signal transmitting interconnect. FIG. 13 illustrates a top down view of the structure of FIG. 12 with select optical fibers connected to select couplers 136. Although only four couplers 136 are shown installed on either side of the SPA, there are two additional openings on each side for installation of additional couplers 136.

The SPA can be mounted to an underlying mounting block, or other mounting structure that is part of the biosensing-imaging system. The mounting block can include SPA mounting stands, such as mounting stands similar to the lid mounting stands 84 (FIG. 10), and the SPA can include SPA attachments for mounting to the SPA mounting stands, where the SPA attachments can be similar to the lid attachments 82 (FIG. 10). To remove the SPA, including the mounting nest 74 with mounted probes 88, the lid 76, and the well slide 68 and electrical interconnect substrate 69, the SPA is detached from the underlying mounting block by unscrewing the SPA attachments and lifting the SPA off from the SPA mouniting stands, and discounting any external connections at the coupler adapters 140. This enables the SPA to be removed from a test environment, such as within an incubator, while leaving the other components of the biosensing-imaging system in place.

FIG. 14 illustrates a perspective exploded view of the probe mount 134 and corresponding probe 88 according to some embodiments. The probe mount 134 includes a mounting bracket 142 with an aperture 144 for accepting mounting stand 94 (FIG. 12) and an aperture 146 for accepting the probe 88. FIG. 15 illustrates a cut-out side view of the probe 88 from FIG. 14 according to some embodiments. The probe 88 includes a body 148, a nut 150, a gasket 152 a washer 154, a washer 156, the optical fiber 92, and the outer sheath 90. To attach the probe 88 to the probe mount 134, the nut 150 is loosened and the body 148 is inserted into the aperture 146 of the mounting bracket 142. Tightening the nut 150 secures the body 148 to the mounting bracket 142. The washer 156 grips the optical fiber 92 when compressed by tightening of the nut 150, thereby fixing the fiber 92 in place. The washer 154 prevents torsion of the washer 156. A depth of the distal end of the optical fiber 92 in the well 70, as shown in FIG. 16, can be adjusted by sliding the optical fiber 92 back or forth through the body 148 while the nut 150 is loosened. Once the desired depth is achieved, the nut 150 is tightened fixing the distal end of the optical fiber 92 in place.

Figure 17:
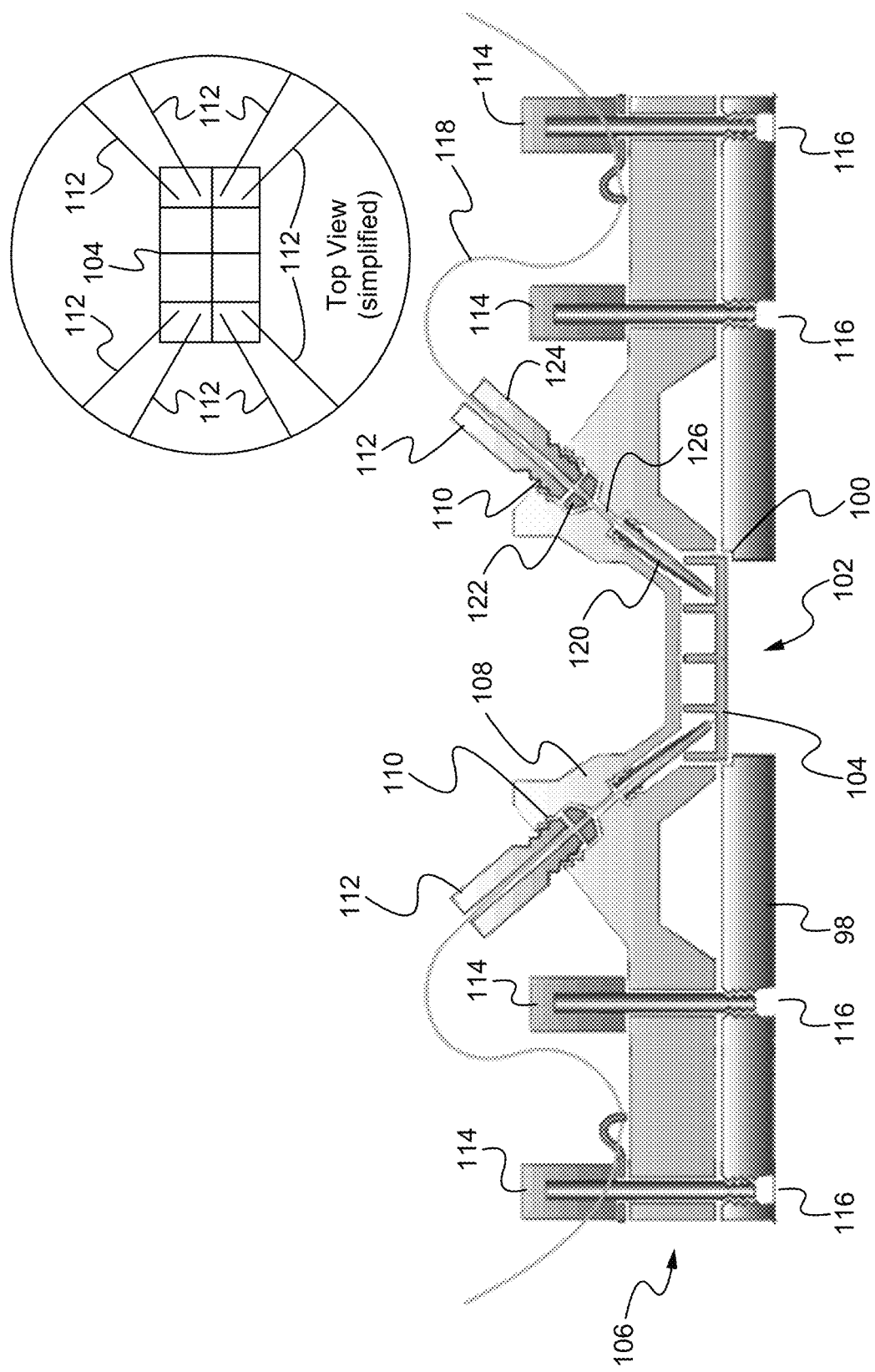
FIG. 17 illustrates a cut-out side view of an alternative lid structure, well slide, and mounting nest according to some embodiments.

In some embodiments, the lid itself can be adapted to include mounts for each of the probes. FIG. 17 illustrates a cut-out side view of an alternative lid structure, well slide, and mounting nest according to some embodiments. An SPA 106 includes the lid 108 and a plurality of probes 112. A baseplate 98 has an integrated mounting nest 100 including a recess into which a well slide 104 is positioned and secured. The mounting nest 100 also includes an opening 102 underneath the wells of the well slide 104 through which optical interrogation can be performed. The baseplate 98 also includes lid mounting apertures 116 to which the lid is mounted via a plurality of lid attachments 114. In some embodiments, the lid attachments 114 are thumb screws configured to screw into the lid mounting apertures 116. It is understood that the lid attachments and lid mounting apertures can be alternatively configured, such as clamps, latches, ball and socket, snap buttons, and the like. The lid 108 also includes a plurality of mounting apertures 110 into each of which one of the probes 112 can be mounted.

In some embodiments, the 112 includes an optical fiber 118, a Luer fitting 120, a fiber adjustment gasket 112, and a fiber adjustment screw 124. The probe 112 is secured into a corresponding mounting aperture 110 in the lid 108 via the fiber adjustment screw 124. The fiber adjustment screw 124 is also used to adjust a depth of the distal end of the optical fiber within the well. The optical fiber 118 passes through the fiber adjustment screw 124 and the gasket 122, through a guideway 126 in the lid 108, through the Luer fitting 120, and into the well. The number, density, and pattern of the apertures and guideways in the lid can be application specific and configured so as to enable insertion of one or more probes through the lid cover and into each well. In some embodiments, the entire lid 108 is a single integrated piece. In other embodiments, the portion of the lid 108 that covers the wells slide 104 is removable for providing access to the wells. At least the portion of the lid 108 that covers the well slide 104 is made of optically transparent material to enable optical interrogation from above the well slide 104. In some embodiments, the entire lid 108 is made of optically transparent material.

In the exemplary configuration shown in FIG. 17, the lid 108 is designed such that the probes 112 are inserted into corresponding wells at a non-vertical angle. Alternatively, the lid can configured such that at the top (outer) portion of the lid the probes are mounting at an angle, as shown in FIG. 17, but the lid includes curved guideways that insert the distal end (sensor end) of the probe into the well at a vertical, or near-vertical angle.

Figure 18:
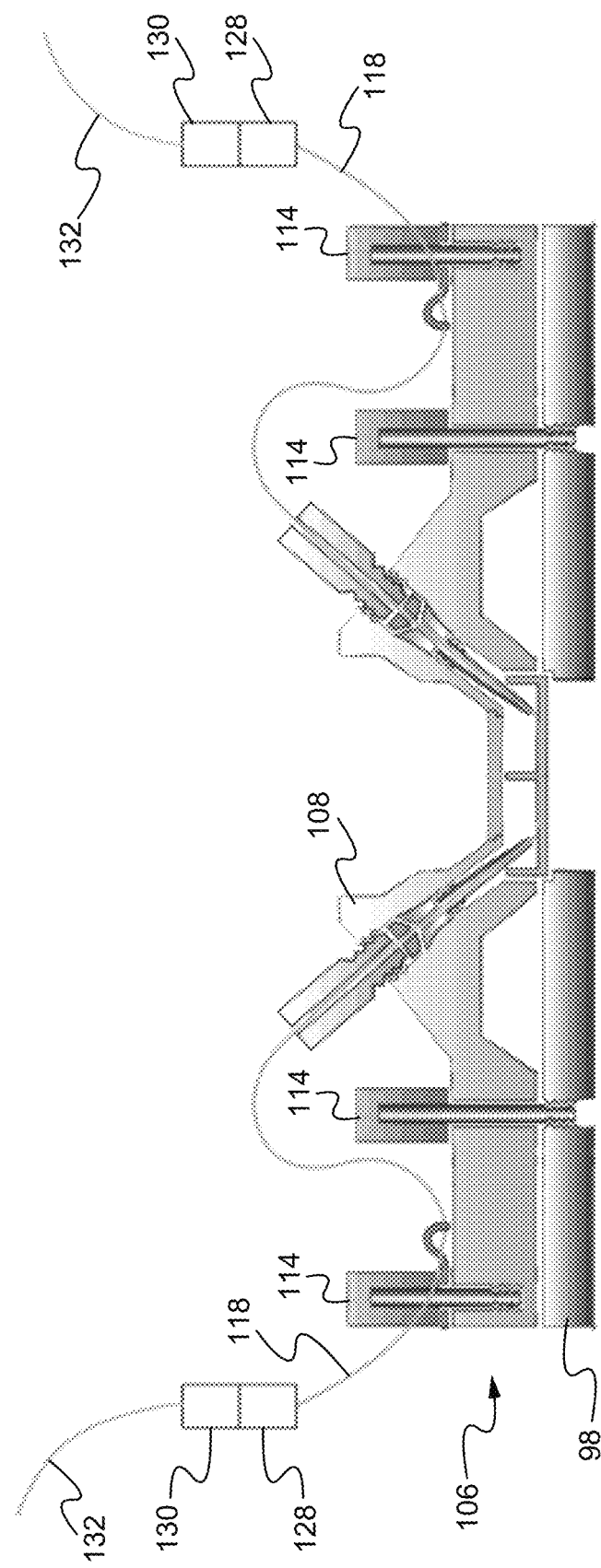
FIG. 18 illustrates the lid structure, well slide, and mounting nest of FIG. 17 with removable fiber couplings.
Figure 19:
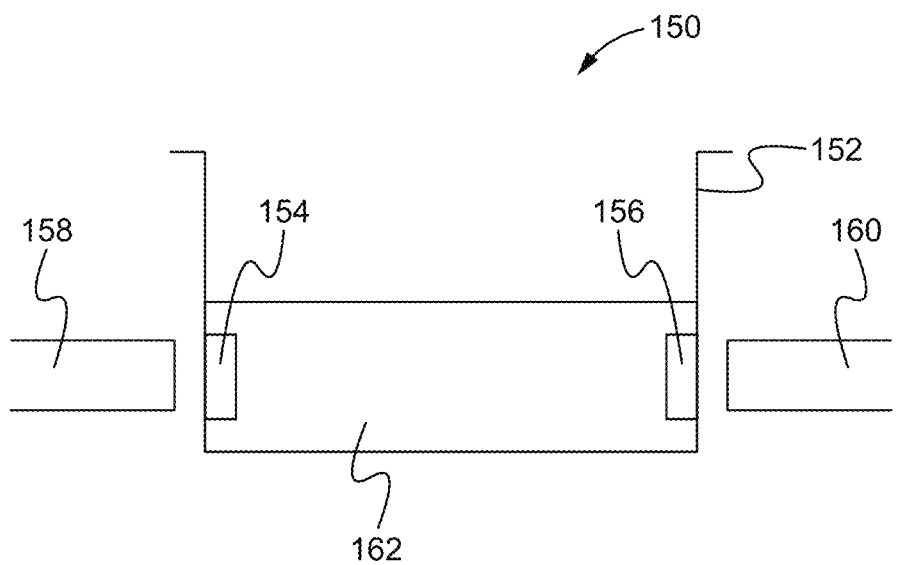
FIG. 19 illustrates a conceptual block diagram of an alternative configuration for performing chemical sensing according to some embodiments.
Figure 20:
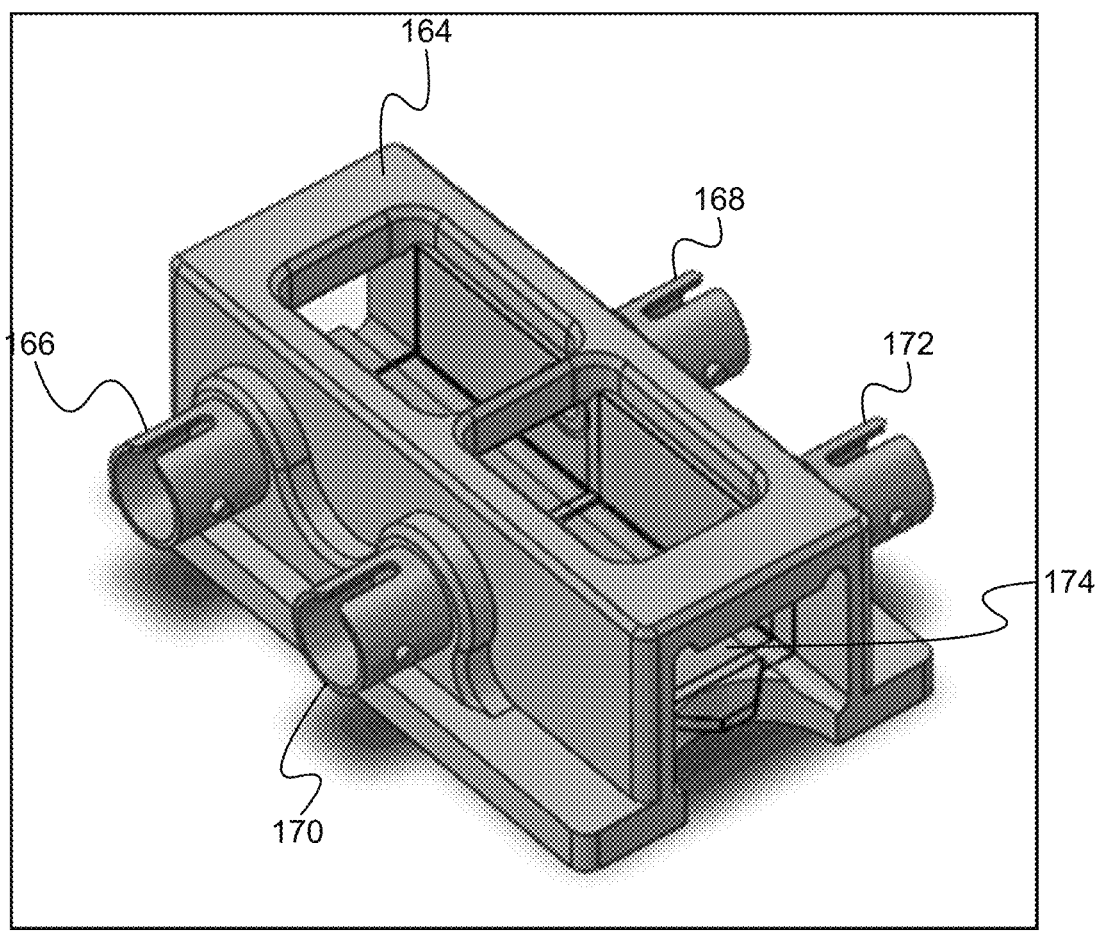
FIG. 20 illustrates a perspective view of an SPA configured to position optical fibers external to well side walls according to some embodiments.

The SPA can be adapted as a removable component within the biosensing imaging system. FIG. 18 illustrates the lid structure, well slide, and mounting nest of FIG. 17 with removable fiber couplings. An end of each optical fiber 118 is connected to a fiber coupler 128, which can be mated to a corresponding coupler 130 to is connected to an external interconnect 132, such as another optical fiber or other type of signal transmitting interconnect. To remove the SPA 106, the lid 108 is detached from the baseplate 98 by unscrewing the lid attachment 114 and discounting the fiber coupler 128 from the coupler 130. This enables the SPA to be removed from a test environment, such as within an incubator, while leaving the other components of the biosensing-imaging system in place. In previous embodiments, certain aspects of chemical sensing are described as using a probe that integrates both the sensing element and the optical illumination/detection element, such as the dye coated optical fiber, where the integrated probe is inserted into the well contents. In other embodiments, the sensing element and the illumination/detection element are separate elements. In this alternative embodiment, the sensing element is positioned within the well and the illumination/detection element is positioned outside the well. In some embodiments, the sensing element is positioned on an interior side wall of the well and the illumination/detection element is positioned external to the well side wall and aligned with the sensing element. In such a configuration, the illumination/detection element used for chemical sensing is eliminated from the optical interrogation (optical sensing mode) performed from above and below the well. FIG. 19 illustrates a conceptual block diagram of an alternative configuration for performing chemical sensing according to some embodiments. A well 150 has well side walls 152. One or more chemical sensors, such as fluorescent dyes, are positioned on the well side walls. In the exemplary configuration shown in FIG. 19, two different types of chemical sensors are used to sense two different chemical characteristics, for example dye 154 is sensitive to pH and dye 156 is sensitive to O2. It is understood that more than one chemical sensor can be used per well for each chemical characteristic to be sensed. The dyes 154 and 156 are immersed in the well contents 162, either at a level corresponding to a fluid sample or at a level corresponding to a culture media. An optical fiber 158 is positioned outside the well side wall and aligned with the dye 154, and an optical fiber 160 is positioned outside the well side wall and aligned with the dye 156. The optical fiber 158 is connected to a measurement device (not shown) that emits light at a wavelength that initiates the fluorescent process for the dye 154, such as a wavelength that initiates the fluorescent process for pH, and the optical fiber 160 is connected to a measurement device (not shown) that emits light at a wavelength that initiates the fluorescent process for the dye 156, such as a wavelength that initiates the fluorescent process for 02. The optical fiber 158 transmits the fluorescent light emitted from the dye 154 back to the connected measurement device, and the optical fiber 160 transmits the fluorescent light emitted from the dye 156 back to the other connected measurement device. It is understood that if more chemical sensors are positioned in the well 150, more corresponding optical fibers would also be positioned accordingly. It is also understood that this concept can be extended to multiple wells. An SPA can be used to properly align the optical fibers with the chemical sensors positioned in each well. FIG. 20 illustrates a perspective view of an SPA configured to position optical fibers external to well side walls according to some embodiments. In the exemplary configuration shown in FIG. 20, the SPA 164 is configured to overlay a well slide 174 that has two wells. It is understood that the SPA can be adapted to well slides having more or less than two wells. The SPA 164 includes couplers 166, 168, 170, and 172 configured to mate with a coupling adapter of an optical fiber. When properly mated to the coupler 166, 168, 170, or 172, the optical fiber is aligned with a corresponding chemical sensor positioned on a well side wall, such as shown in FIG. 19.

In some embodiments, chemical sensing using optical interrogation, such as the processes described in relation to FIGS. 19 and 20, can be implemented into a modified imaging unit. The imaging unit previously described can be modified to include a light source configured to emit a brightfield, for performing the optical sensing mode, and to selectively emit different light wavelengths for fluorescent processes, for performing chemical sensing mode. With such a configuration, chemical sensors, such as fluorescent dyes, can be positioned on the bottom or side walls of each well. As the imaging unit is attached to a movement mechanism, the imaging unit can be aligned with specific areas of the well, such as underneath a pH sensitive dye, and the light source emits a light wavelength sufficient to excite the pH sensitive dye. In turn, the camera within the imaging unit generates an image based on the imaged light resulting from the fluorescence process. The process can be repeated by moving the imaging unit to be aligned with another area of the well, such as underneath an O2 sensitive dye, and the process is repeated using a light wavelength sufficient to excite the O2 sensitive dye. In this manner, the imaging unit can be used to perform both an optical sensing mode and a chemical sensing mode using a single device, and without having to insert probes into the well.

Figure 21:
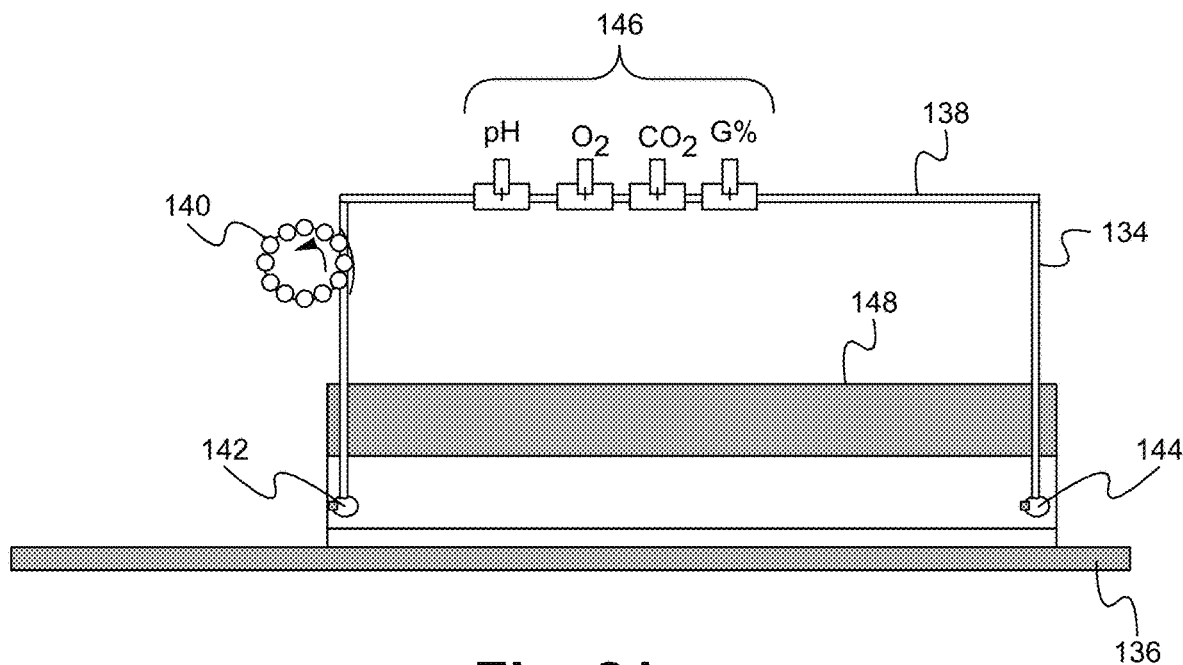
FIG. 21 illustrates a SPA having a flow-through feeding configuration for extracting and analyzing small sample sizes from the well according to some embodiments.

In the embodiments described above, the contents of the well are interrogated and certain characteristics are sensed while the well contents remain in the well. In other embodiments, the SPA is configured to extract and analyze small samples from the well contents while the extracted small sample is external to the well. FIG. 21 illustrates a SPA having a flow-through feeding configuration for extracting and analyzing small sample sizes from the well according to some embodiments. A fluid sample and nutrient media are contained in a well 134 having a bottom wall and side walls. The well 134 is part of a well slide which is attached to an electrical interconnects substrate 136. The well slide 136 can include one or more wells, one well is shown in FIG. 21. The configuration and interaction of the well slide and the electrical interconnects substrate 136 can be similar to the well slides and electrical interconnects substrates previously described. A microfluidics loop 138 includes microfluidic channels for transporting fluid. The microfluidic channels include a first open end 142 and a second open end 144. A pump 140 is connected to the microfluidics loop 138 and functions to draw the small sample volume in through the first open end 142, through the microfluidics loop 138, and out the second open end 144 back into the well 134. One or more sensors 146 are connected to the micorofluidic loop 138. The small sample extracted from the well 134 is pumped through the sensors 146 where specific chemical characteristics are sensed. Although not shown in FIG. 21, each of the one or more sensors 146 can be connected to a metering device or other type of device capable of measuring the sensed chemical characteristic. In the exemplary configuration, the sensors 146 include a pH sensor, an O2 sensor, a CO2 sensor, and a glucose sensor. It is understood that more or less sensors can be used, of differing types than those shown in FIG. 21. The one or more sensors 146 can be in-line probes or read-through wall optical indicators, such as films/foils/dots, of the types previously described. In some embodiments, the fluid sample is suspended in a gel, such as Matrigel, and this approach treats the gel as fixed, and the nutrient media, such as DMEM, is movable. The small sample extracted from the well 134 is part of the nutrient media. In some embodiments, the positions of the first open end 142 and the second open end 144 are proximate the well side walls so as to minimize optical occlusion of interrogating light source and imaging units, which can be positioned above and below the well slide in a similar manner as previously described. Although FIG. 21 shows a single input microfluidic channel (input channel at end 142) and a single output microfludic channel (output channel at end 144) it is understood that multiple input and output channels can be inserted into the well contents, and such multiple channels can be distributed throughout the well (X-Y plane) to draw fluid sample from a constellation of areas within the well. In some embodiments, the microfluidic channels are made of a transparent material to minimize, if not prevent, optical occlusion. Although the microfluidics loop 138 is shown in FIG. 21 as being positioned above the well slide, this is merely to convey the concept. In practice, the microfluidcis loop, pump, and sensors can be routed and positioned away from the lid 148 so as to not occlude optical interrogation of the wells. The lid 148 is made of a transparent material.

Figure 22:
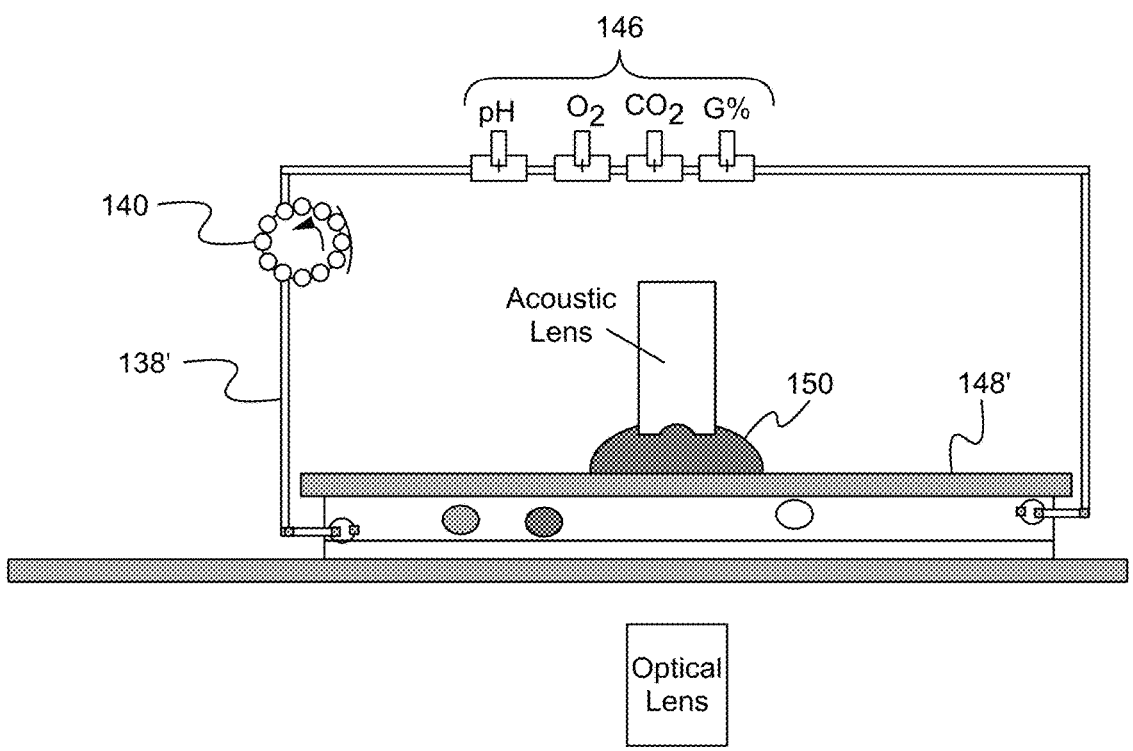
FIG. 22 illustrates a SPA having a flow-through feeding configuration for extracting and analyzing small sample sizes from the well according to other embodiments.

The flow-through feeding configuration can be modified to have the microfluidic loop access the well contents through the well side walls, and the lid can be modified to enable a second imaging mode. FIG. 22 illustrates a SPA having a flow-through feeding configuration for extracting and analyzing small sample sizes from the well according to other embodiments. The flow-through feeding configuration used for extracting and analyzing a small sample volume from the well contents shown in FIG. 22 is similar to that shown in FIG. 21 except that the microfluidic loop 138' is modified so that the microfluidic channels pass through the well side walls to access the well contents. Accessing the well contents through the well side walls enables the lid 148 (FIG. 21) to be modified for enabling a second imaging unit 150 to be positioned above the lid 148'. The lid 148' could also be a another electrical interconnects substrate. The lid 148' can either be mounted after the fluid sample and nutrient media are added to the well, or additional microfluidic channels can be configured to pass through the well side walls to inject contents into the well.

Figure 23:
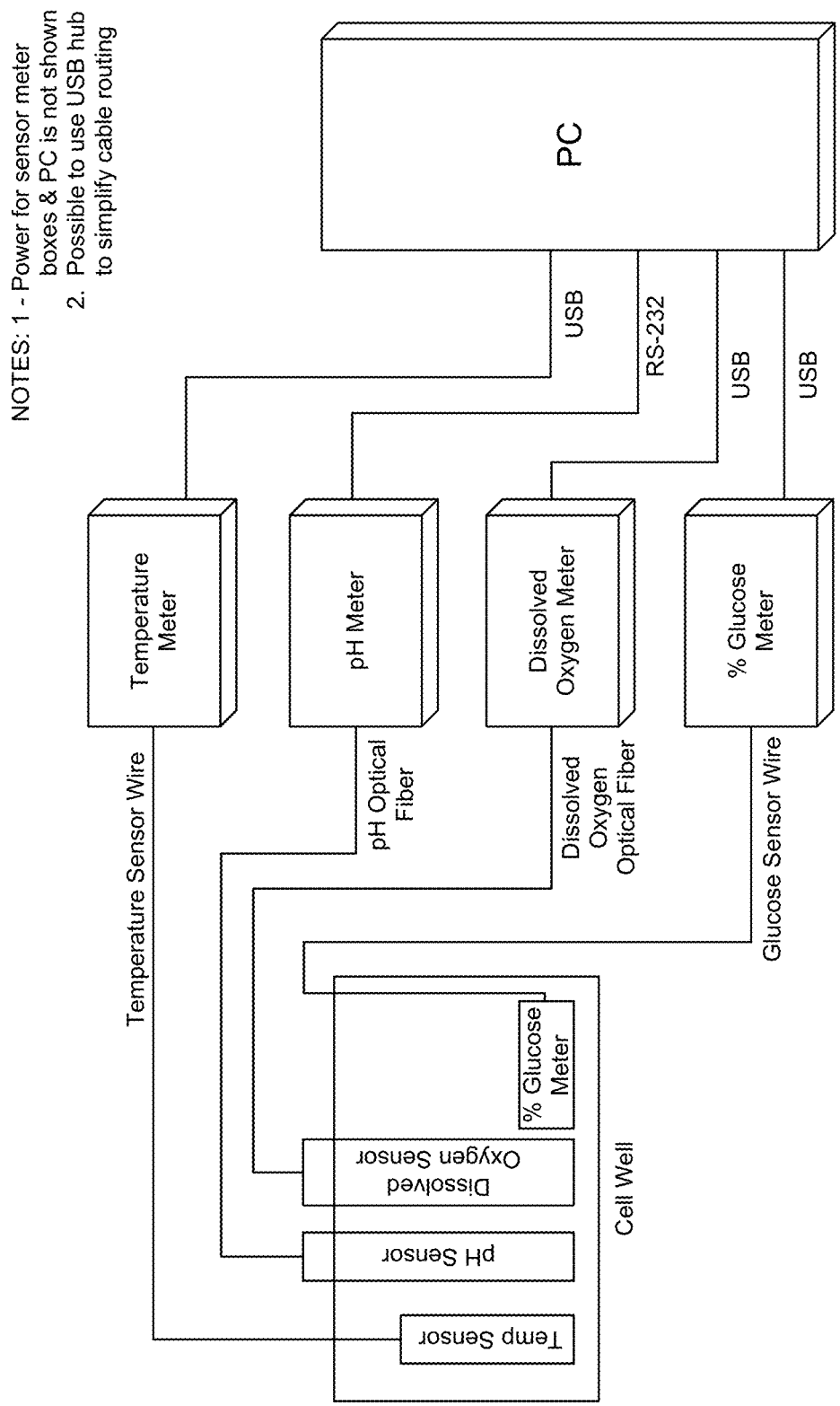
FIG. 23 illustrates a schematic block diagram for polymodal sensing.

Data signals corresponding to sensed measurements from each of the different sensor types are transmitted to an electronic device, such as a computer, and can be compiled within a unified common user interface that enables operation of the for different measurement modes under one software interface. FIG. 23 illustrates a schematic block diagram for polymodal sensing. As previously described, multiple different sensing modes can be implemented and executed within each well, where the different sensing can be performed by different sensor types. Example sensor types include, but are not limited to, temperature sensors, pH sensors, O2 sensors, lactose, selective ion, glucose sensors, and secretomes. Although not shown in FIG. 21, electrodes can also be used as a type of sensor for sensing impedance. The data sensed by each sensor is transmitted by corresponding optical fibers to corresponding measurement devices, such as measurement meters, the results of which are transmitted to an electronic device for analysis.

Figure 24:
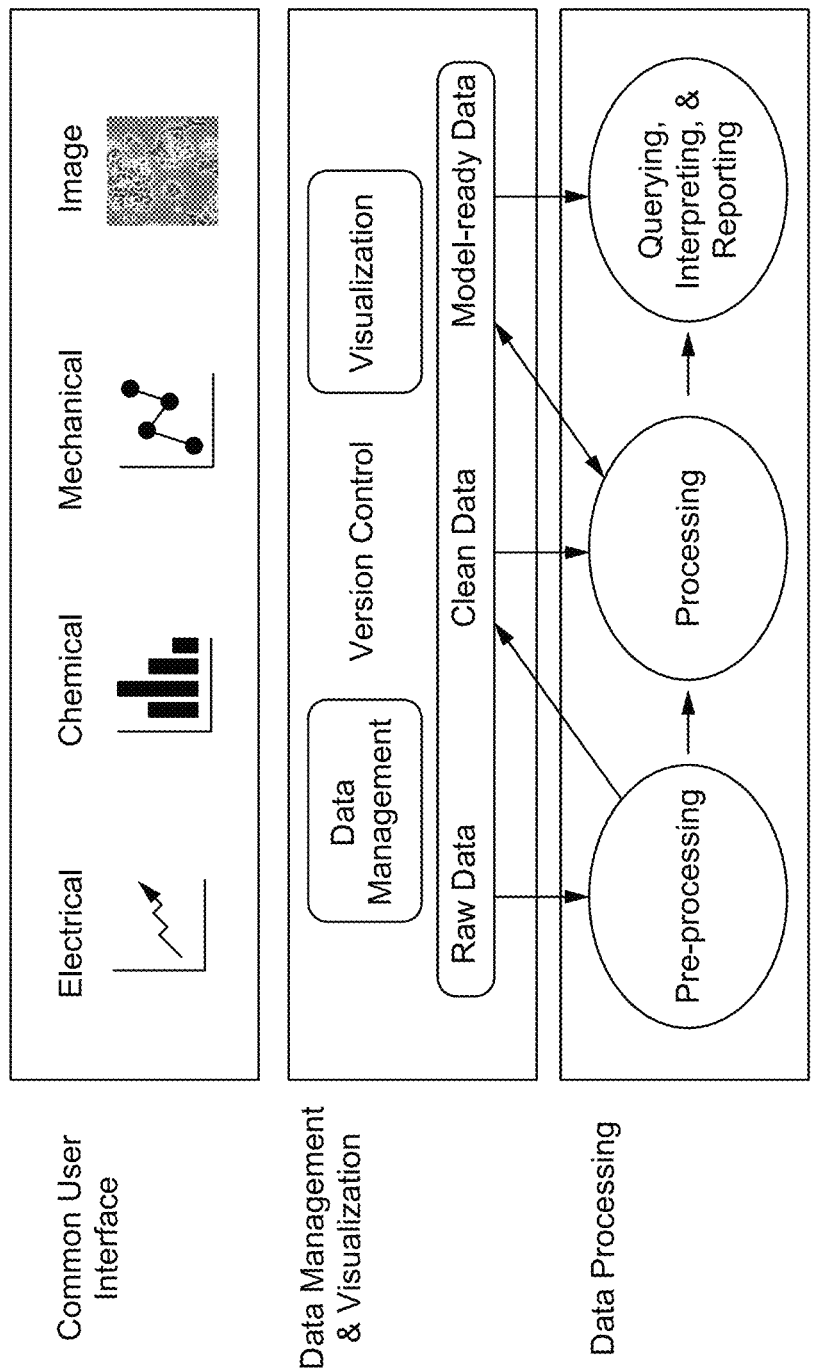
FIGS. 24 and 25 illustrate various functions and interrelationships performed using data analytics algorithms.
Figure 25:
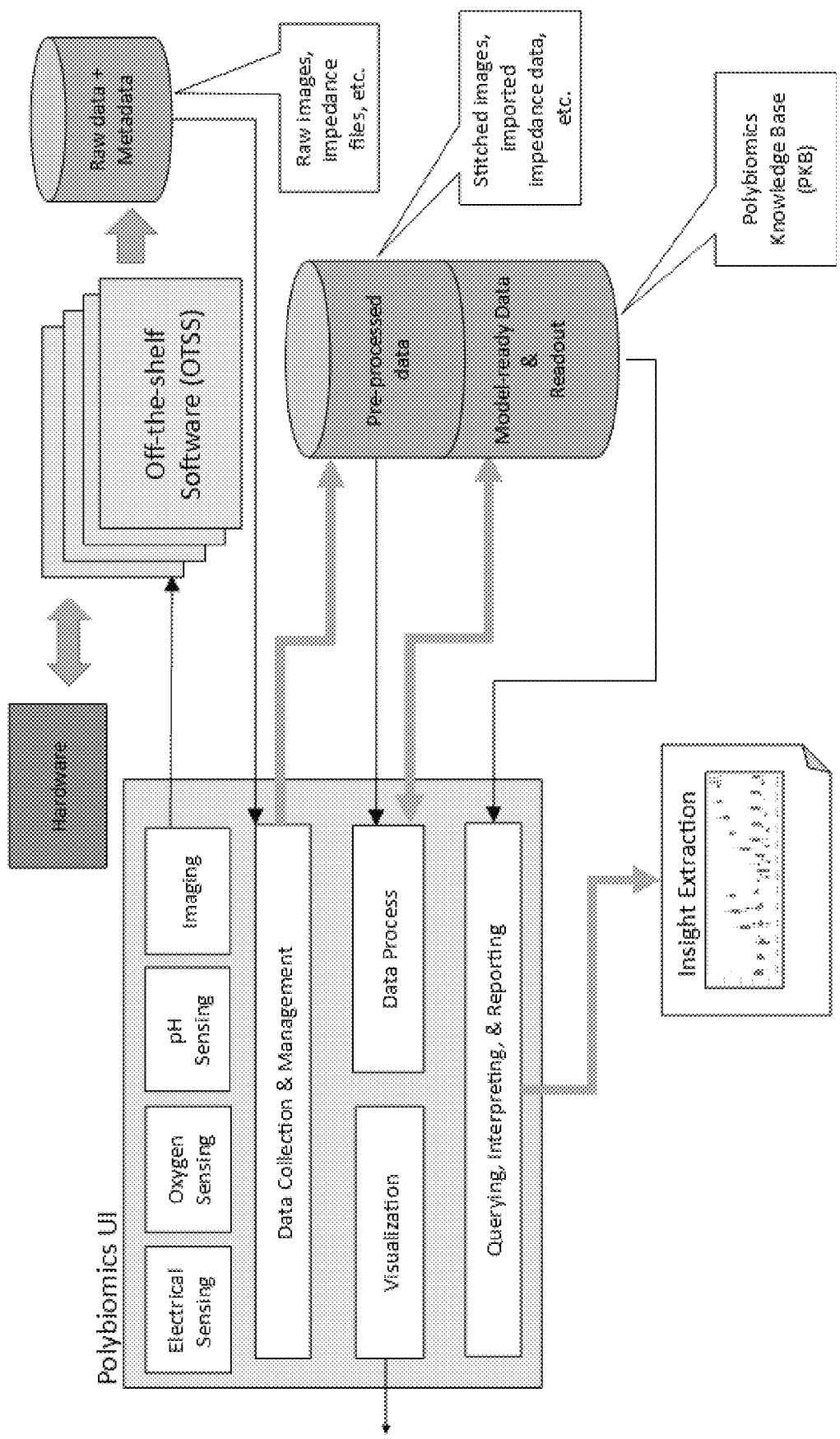

Data analytics is performed by the electronic device for data fusion and polymodal analysis using the received measured data. FIGS. 24 and 25 illustrate various functions and interrelationships performed using data analytics algorithms. The algorithms enable data annotation, data normalization to prepare model ready data, data viewing, data integration and querying new information. Polysensor data integration and fusion uses technology to enable combining data from several sources in order to form a unified picture. Data fusion is a multilevel, multifaceted process handling the automatic detection, association, correlation, estimation, and combination of data and information from several sources. Such systems are widely used in various areas such as sensor networks, robotics, video/image processing, and intelligent systems. However, there is no existing model for data integration as described herein. In general, challenges of data integration in cellular biological environments include: data imperfection, outliers and spurious data, conflicting data, heterogeneous data modalities, data correlation, data alignment/registration, operational timing, static vs. dynamic phenomena. The data acquisition and integration technologies described herein are designed to tackle and minimize such challenges.

The present application has been described in terms of specific embodiments incorporating details to facilitate the understanding of the principles of construction and operation of the biosensing-imaging system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A device comprising:
    a test plate comprising an electrical interconnects substrate and a well slide coupled to the electrical interconnects substrate, where the well slide includes at least one well, each well of the at least one well is configured to contain a substance to be analyzed and comprises a side wall structure and a bottom wall;
    a plurality of sensors configured to sense a plurality of different modalities, wherein each sensor is configured to sense a characteristic of the substance according to one of the modalities and to generate a corresponding sensed signal, further wherein at least one of the plurality of sensors is attached to the bottom wall or the side wall structure of each well;
    one or more probes inserted into each well, each probe of the probes includes a body, an optical path locking mechanism and an optical path, wherein the plurality of sensors includes at least one chemical sensor configured to sense according to a chemical measuring modality, further wherein each probe includes the chemical sensor coupled to an end of the optical path, wherein when the locking mechanism is in an unlocked position on the body, the optical path is able to slide through an aperture of the body to adjust an amount the optical path extends out of an inside end of the body, and further wherein when the locking mechanism is in a locked position on the body, the optical path is prevented from sliding through the aperture of the body; and
    an optical reader coupled to the optical path.

2. The device of claim 1 wherein the optical path comprises an optical fiber.

3. The device of claim 2 wherein the chemical sensor comprises a fluorescent dye coated on the end of the optical fiber, and a light source and the optical fiber are configured to transmit and emit a light to the dye at a first light wavelength sufficient to fluoresce the dye in the presence of a specific chemical characteristic to be sensed, and the optical fiber is configured to transmit resulting fluorescence emission to the optical reader to measure a second light wavelength corresponding to the presence of the chemical characteristic.

4. The device of claim 2 wherein the chemical sensor comprises a fluorescent dye coated on the end of the optical fiber, and a light source and the optical fiber are configured to transmit and emit a light to the dye at a first light wavelength sufficient to fluoresce the dye in the presence of a specific chemical characteristic to be sensed, further wherein the optical path further comprises a second optical fiber configured to transmit resulting fluorescence emission to the optical reader to measure a second light wavelength corresponding to the presence of the chemical characteristic.

5. The device of claim 2 wherein the probe further comprises a transparent sheath surrounding the optical fiber inserted in the well.

6. The device of claim 1 wherein the chemical sensor comprises a voltage sensitive dye.

7. The device of claim 1 further comprising a lid configured to cover the well slide, wherein the lid comprises at least one opening per well in the well slide, one probe inserted through each opening in the lid.

8. The device of claim 1 further comprising a sensor platform assembly coupled to the well slide, wherein the sensor platform assembly includes one or more probe mounting stands positioned about a perimeter of each well of the at least one well, each probe of the probes is mounted to one probe mounting stands.

9. The device of claim 1 further comprising an optical system for imaging the substance to be analyzed contained within each well of the well slide, wherein the electrical interconnects substrate and the bottom wall of the well slide comprise an optically transparent material, the optical system comprising:
 a. a light source;
 b. optical components coupled to the light source and configured to direct light from the light source into each well; and
 c. a camera aligned with the well slide, the light source, and the optical components.

10. The device of claim 9 wherein the optical system further comprises:
 a. a mechanism coupled to the camera, wherein the mechanism is configured to move the camera relative to the well slide; and
 b. control circuitry coupled to the mechanism, wherein the control circuitry is configured to control movement of the mechanism.

11. The device of claim 10 further comprising an incubator, wherein the test plate with plurality of sensors, the plurality of probes, and the optical system are configured to fit within the incubator and operate within the incubator while the incubator is functioning.

12. The device of claim 11 further comprising a computer external to the incubator, wherein the computer is coupled to the control circuitry.

13. The device of claim 1 wherein the electrical interconnects substrate comprises a plurality of electrodes each to sense an electrical impedance characteristic and to generate a corresponding sensed signal, wherein at least one electrode is aligned with each well.

14. The device of claim 1 further comprising an insert including a transparent substrate and one or more of the plurality of sensors coupled to the substrate, wherein the substrate comprises one or more support structures that extend into each well and at least one conductive interconnect coupled to each support structures, further wherein one or more sensors are coupled to each support structure, each sensor coupled to a corresponding conductive interconnect of the support structure, wherein each sensor is configured to sense a characteristic of the substance and to generate a corresponding sensed signal.

15. The device of claim 14 wherein each of the sensors coupled to the substrate of the insert is one of an electrically conductive electrode, a chemical sensor, an acoustic sensor, a secretome sensor, or an electrochemical sensor.

16. The device of claim 1 wherein the at least one of the plurality of sensors attached to the bottom wall or the side wall structure of each well is one of an electrically conductive electrode, a chemical sensor, an acoustic sensor, a secretome sensor, or an electrochemical sensor.

17. The device of claim 1 wherein the plurality of different modalities include an optical measuring modality, an impedance measuring modality, the chemical measuring modality, an acoustic measuring modality, and a secretome measuring modality.

18. The device of claim 1 wherein the substance to be analyzed includes a single biological sample to be analyzed.

19. The device of claim 1 wherein the substance to be analyzed includes multiple different biological samples to be analyzed, wherein the multiple different biological samples to be analyzed are contained in each well.

20. The device of claim 1 wherein the substance to be analyzed includes multiple different biological samples to be analyzed and the well slide comprises a plurality of wells, wherein one or more of the multiple different biological samples to be analyzed are contained in each well, and each well contains different biological samples than each other well.

21. A device comprising:
 a test plate comprising an electrical interconnects substrate and a well slide coupled to the electrical interconnects substrate, where the well slide includes at least one well, each well of the at least one well is configured to contain a substance to be analyzed and comprises a bottom wall and a transparent side wall structure formed by a plurality of side walls;
 a plurality of sensors configured to sense a plurality of different modalities, wherein each sensor is configured to sense a characteristic of the substance according to one of the modalities and to generate a corresponding sensed signal, further wherein at least one of the plurality of sensors is attached to the bottom wall or the side wall structure of each well;
 a plurality of optical paths external to the well slide and aligned with the side wall structure of each well, wherein one of the optical paths is aligned with one of the side walls of one of the wells and another of the optical paths is aligned with a different one of the side walls of the one of the wells, and further wherein the plurality of sensors includes:
  at least one chemical sensor configured to sense a first characteristic of the substance according to a chemical measuring modality and positioned on an interior surface of the one of the side walls of the one of the wells; and
  another sensor configured to sense a different characteristic of the substance that is not sensed by the at least one chemical sensor and positioned on an inner surface of the different one of the side walls of the one of the wells; and
 an optical reader coupled to the optical path.

22. The device of claim 21 wherein the optical path comprises an optical fiber.

23. The device of claim 22 wherein the chemical sensor comprises a fluorescent dye coupled to the interior surface of the side wall structure, and a light source and the optical fiber are configured to transmit and emit a light to the dye at a first light wavelength sufficient to fluoresce the dye in the presence of a specific chemical characteristic to be sensed, and the optical fiber is configured to transmit resulting fluorescence emission to the optical reader to measure a second light wavelength corresponding to the presence of the chemical characteristic.

24. The device of claim 21 wherein the chemical sensor comprises a voltage sensitive dye.

25. The device of claim 24 further comprising a sensor platform assembly coupled to the well slide, wherein the sensor platform assembly includes one or more optical path mounting stands positioned about a perimeter of each well of the at least one well, each optical path of the optical paths is mounted to one probe mounting stands.

26. The device of claim 21 further comprising an optical system for imaging the substance to be analyzed contained within each well of the well slide, wherein the electrical interconnects substrate and the bottom wall of the well slide comprise an optically transparent material, the optical system comprising:
   a. a light source;
   b. optical components coupled to the light source and configured to direct light from the light source into each well; and
   c. a camera aligned with the well slide, the light source, and the optical components.

27. The device of claim 26 wherein the optical system further comprises:
   a. a mechanism coupled to the camera, wherein the mechanism is configured to move the camera relative to the well slide; and
   b. control circuitry coupled to the mechanism, wherein the control circuitry is configured to control movement of the mechanism.

28. The device of claim 27 further comprising an incubator, wherein the test plate with plurality of sensors, the one or more optical paths, and the optical system are configured to fit within the incubator and operate within the incubator while the incubator is functioning.

29. The device of claim 28 further comprising a computer external to the incubator, wherein the computer is coupled to the control circuitry.

30. The device of claim 21 wherein the electrical interconnects substrate comprises a plurality of electrodes each to sense an electrical impedance characteristic and to generate a corresponding sensed signal, wherein at least one electrode is aligned with each well.

31. The device of claim 21 further comprising an insert including a transparent substrate and one or more of the plurality of sensors coupled to the substrate, wherein the substrate comprises one or more support structures that extend into each well and at least one conductive interconnect coupled to each support structures, further wherein one or more sensors are coupled to each support structure, each sensor coupled to a corresponding conductive interconnect of the support structure, wherein each sensor is configured to sense a characteristic of the substance and to generate a corresponding sensed signal.

32. The device of claim 31 wherein each of the sensors coupled to the substrate of the insert is one of an electrically conductive electrode, a chemical sensor, an acoustic sensor, a secretome sensor, or an electrochemical sensor.

33. The device of claim 21 wherein the at least one of the plurality of sensors attached to the bottom wall or the side wall structure of each well is one of an electrically conductive electrode, a chemical sensor, an acoustic sensor, a secretome sensor, or an electrochemical sensor.

34. The device of claim 21 wherein the plurality of different modalities include an optical measuring modality, an impedance measuring modality, the chemical measuring modality, an acoustic measuring modality, and a secretome measuring modality.

35. The device of claim 21 wherein the substance to be analyzed includes a single biological sample to be analyzed.

36. The device of claim 21 wherein the substance to be analyzed includes multiple different biological samples to be analyzed, wherein the multiple different biological samples to be analyzed are contained in each well.

37. The device of claim 21 wherein the substance to be analyzed includes multiple different biological samples to be analyzed and the well slide comprises a plurality of wells, wherein one or more of the multiple different biological samples to be analyzed are contained in each well, and each well contains different biological samples than each other well.

* * * * *